(12) United States Patent  (10) Patent No.: US 6,448,728 B2
Noro et al.                  (45) Date of Patent:    Sep. 10, 2002

(54) ELECTRIC POWER STEERING APPARATUS

(75) Inventors: Yoshiki Noro; Yoshinobu Mukai, both of Wako (JP)

(73) Assignee: Honda Giken Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/818,178

(22) Filed: Mar. 27, 2001

(30) Foreign Application Priority Data

Mar. 31, 2000 (JP) .................................. 2000-098933
Mar. 31, 2000 (JP) .................................. 2000-098934

(51) Int. Cl.$^7$ .................................. B62D 5/04
(52) U.S. Cl. .................. 318/433; 318/432; 318/476; 318/488; 180/443
(58) Field of Search .................. 318/432, 433, 318/434, 461, 463, 474, 476, 477, 488, 489; 180/443

(56) References Cited

U.S. PATENT DOCUMENTS

| | | | |
|---|---|---|---|
| 4,992,944 A | * | 2/1991 | Noto et al. ............. 180/79.1 X |
| 5,767,642 A | * | 6/1998 | Furukawa ................... 318/286 |
| 5,881,836 A | * | 3/1999 | Nishimoto et al. ......... 180/446 |
| 5,988,310 A | * | 11/1999 | Nishino et al. ............. 180/443 |
| 6,129,172 A | * | 10/2000 | Yoshida et al. ............. 180/446 |
| 6,240,349 B1 | * | 5/2001 | Nishimoto et al. ..... 180/443 X |

FOREIGN PATENT DOCUMENTS

| | | |
|---|---|---|
| JP | 60-80976 | 5/1985 |
| JP | 09-86421 | 3/1997 |

* cited by examiner

Primary Examiner—Bentsu Ro
(74) Attorney, Agent, or Firm—Merchant & Gould P.C.

(57) ABSTRACT

The controller possesses a reference torque signal setting unit which generates a reference signal which becomes high when the detected signal becomes high based on at least the signal detected from the steering torque sensor; a correction torque signal setting unit which generates a correction torque signal ($D_N*R_T*R_V$), which becomes high when the detected signal becomes high based on at least the signals detected from the revolution number sensor for the electric motor and from the vehicle speed sensor; and a target torque signal calculator which subtracts the correction torque signal from the reference torque signal ($D_N*R_T*R_V$) to output a target torque signal ($D_T+-D_N*R_T*R_V$) to the electric motor; and the controller also making the correction torque signal high when failure of the vehicle speed sensor is detected. For this reason, even if the vehicle speed sensor fails, light steering operation can be performed at a low vehicle speed range and the stability of the steering system can be obtained at a high vehicle speed range.

11 Claims, 9 Drawing Sheets

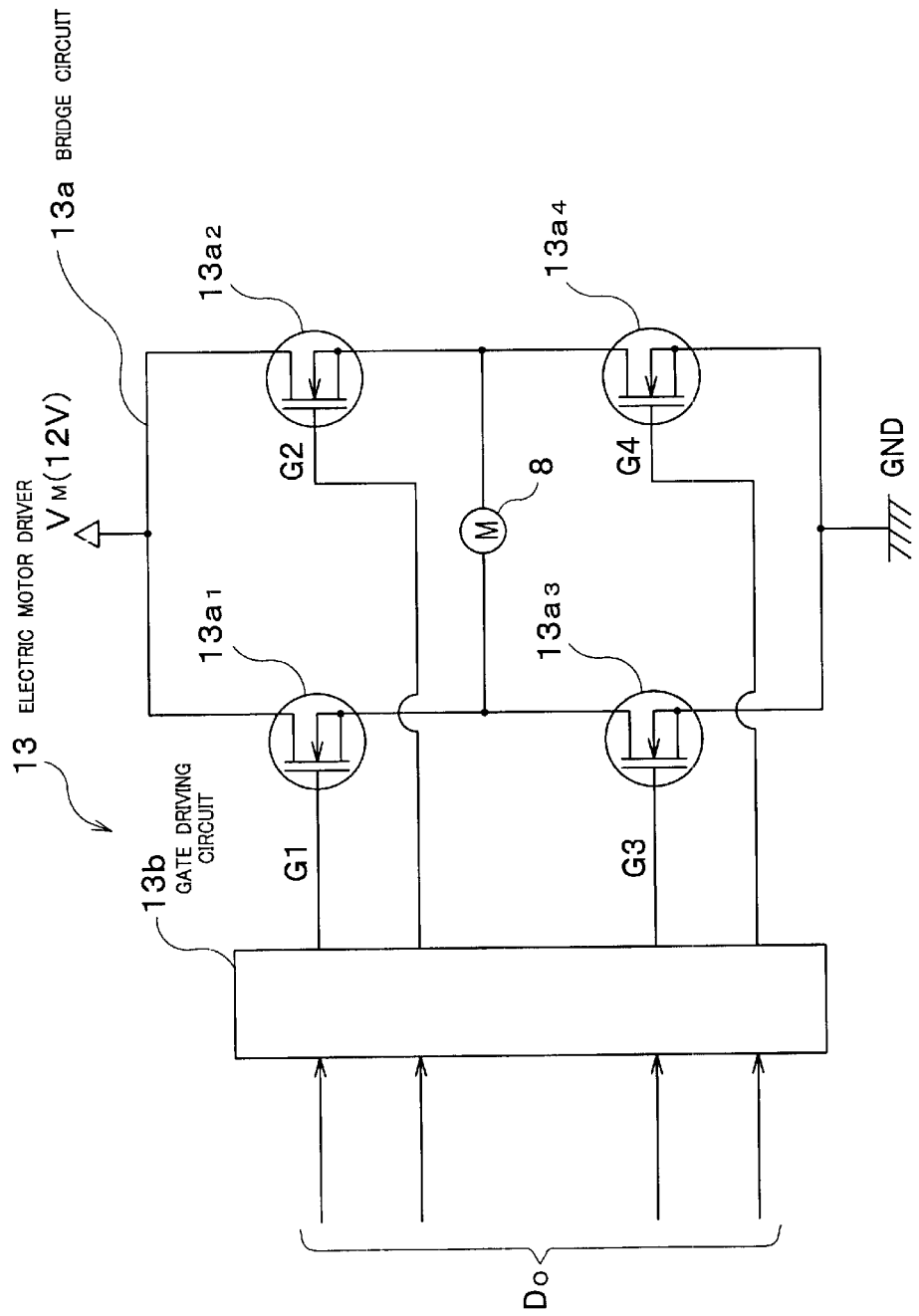

ELECTRIC POWER STEERING APPARATUS

FIELD OF THE INVENTION

The present invention relates to an electric motor power steering apparatus, which allows an electric motor power to act upon a steering system to reduce the steering force of a driver. More particularly, it relates to an electric power steering apparatus, which not only provides stability of the steering system at a high vehicle speed range but also operates to require reduced steering assistance at a low vehicle speed range even at the time of failure of a vehicle speed sensor.

BACKGROUND OF THE INVENTION

An electric power steering apparatus reduces (assists) steering force of a driver by the direct action of driving force of an electric motor steering. A vehicle having an electric power steering apparatus mounted thereon has a function of reducing the movement of the steering wheel whereby the driver needs not to operate the steering with strong force.

As one runs a vehicle at a higher speed, because of the reaction force from a road surface the steering wheel can move in a light manner as a rule. Therefore, at a time of running the vehicle at a high speed range, as large an assist steering torque is not required as is needed at the time of a low speed range. For this reason, the electric power steering apparatus controls in such a manner that the higher the vehicle speed based on the vehicle speed sensor, the lower the assist steering torque needed. Likewise, the steering force through a large assist steering torque at a low speed range makes it possible to enjoy steering operation in an easy manner, while decreasing the assist steering torque at a high speed thereby stabilizes the steering system.

FIG. 9 is the block configuration diagram of the electric system of a conventional electric power steering apparatus.

In this figure, a controller 112 is composed of a target current setting unit 121, a deviation calculator 122, a PDI controller 123, and a control signal output unit 124. The operation of the conventional electric power steering apparatus in FIG. 9 will now be described.

(1) The target current setting unit 121 inputs a steering torque signal from a steering torque sensor TS, which detects the steering torque of the driver and a vehicle speed signal from a vehicle speed sensor VS. According to a "steering torque signal/vehicle speed signal-target current" map (not shown), which is increased when the steering. torque is increased and/or vehicle speed signal is decreased, the target current setting unit 121 decides the target current and outputs the detected target current to the deviation calculator 122. The target current setting unit 121 decides the target value of the current running though the electric motor.

(2) The deviation calculator 122 receives as input the target current and an electric motor current from an electric motor current sensor IS to calculate the deviation of them and outputs a deviation signal to the PID control unit 123.

(3) The PID controller 123 performs the procedure of P [proportion], I[integration], and D[differentiation] of the deviation signal and generates a PID signal, which is outputted to the control signal output unit 124.

(4) The control signal output unit 124 inputs the PID signal to generate an electric motor control signal composed of a direction signal and a PWM signal and outputs it to an electric motor driver 113.

(5) The electric motor driver 113 is composed of a gate driving circuit (not shown) and a bridge circuit having electric field effect transistors (not shown), and outputs an electric motor driving signal for driving an electric motor 108.

(6) The electric motor 108 is driven based on the electric motor driving signal, i.e., the steering torque signal and the vehicle speed signal; and the electric motor 108 applies an assist steering torque to a steering system (not shown).

By such a configuration, the steering operation is assisted by a large assist steering torque at a low vehicle speed range, making it possible to perform steering operation in a light manner. Conversely, at a high vehicle speed range, the assist steering torque becomes small to stabilize the steering system.

When the vehicle speed sensor fails, the assist steering torque cannot be controlled based on the vehicle speed. In this case, the electric power steering apparatus stops the control based on the vehicle speed and controls the assist steering torque at a constant level by setting a given dummy speed as a fail-safe action. For example, Japanese Patent Laid open publication No.60-80976 discloses a power steering apparatus which controls the steering force responding to the vehicle speed at the time of normal mode, and at the time of failure of the vehicle speed sensor, which generates control output so as to set the steering force (assist steering torque) at the middle value in a control range by a vehicle speed response. This is the same as the vehicle speed of the middle value being set as the dummy vehicle speed.

On the other hand, a vehicle having a "hydraulic power steering apparatus" provided thereon, which varies an assist steering torque according to the revolution number of the engine until a vehicle speed signal is obtained and which varies the assist steering torque to respond to the vehicle speed at the time of obtaining the vehicle speed signal, has been known. According to our Japanese Patent Laid open publication No.9-86421, as a fail-safe measure dealing with the situation where no vehicle speed signal can be obtained in "electric power steering apparatus" due to any cause, a technique has been taught which varies the assist steering torque according to the revolution number of the engine until a vehicle speed signal is obtained, and switches the control of the assist steering torque to respond to the vehicle speed at the time of obtaining the vehicle speed signal. For example, the situation where the vehicle speed signal V in FIG. 9 is switched to the signal of the revolution number of the engine.

However, if a small value is taken as the dummy vehicle speed, although a light steering operation can be performed at a low vehicle speed range with a large assist steering torque, the movement of the steering wheel becomes too light, thereby lacking the stability of the steering system at a high vehicle speed range. In contrast, if a large value is taken as the dummy vehicle speed, the steering system is stabilized at a high vehicle speed range due to the small assist steering torque, but a strong force for steering operation must be applied at a low vehicle speed range. The steering force (assist steering torque) fixed at the middle value in the control range (dummy vehicle speed being set at a middle value) in order to respond to the vehicle speed as mentioned in Japanese Laid open publication No. 60-80976 leads to a lackadaisical result in terms of the facts that the assist steering torque becomes insufficient and steering operation becomes heavy at a low vehicle speed range, while the assist steering torque becomes in excess and stability of the steering system becomes insufficient at a high vehicle speed.

Furthermore, in the situation where the assist steering torque is varied according to the revolution number of the engine when no vehicle speed signal is obtained, the relation between the revolution number and the vehicle speed depends upon the gear ratio of a transmission (gear position). The change in the revolution number of the, engine totally has a relation with the vehicle speed, but sometimes occurs in a sharp manner in comparison with the change in the vehicle speed. Specifically, although the change in the revolution number of the engine is associated with the vehicle speed as a whole, the revolution number of the engine is sometimes changed irrelevant to the change in the vehicle speed. Consequently, such a configuration is not preferable because the change in the revolution number of the engine sensitively irrelevant to the vehicle speed has an affect upon the magnitude of the assist steering torque, changing steering feeling for the worse.

SUMMARY OF THE INVENTION

This invention has been made to solve the above problems, and it is, therefore, a main object of the invention to provide an electric power steering apparatus in which light steering operation is available at a low vehicle speed range and stability of the steering system can be obtained at a high vehicle speed range even if the vehicle speed sensor fails; and further steering feeling can be obtained.

The present invention which attains the object concerns an electric power steering apparatus comprising: an electric motor which applies an assist steering torque to the steering system of a vehicle; a steering torque sensor which detects the manual steering torque of said steering system; a vehicle speed sensor which detects the vehicle speed of said vehicle; a revolution number sensor for said electric motor which detects the revolution number of said electric motor; a controller which generates a control signal for controlling said electric motor: and a driver which generates a driving signal for driving said electric motor based on said control signal, said controller possessing: a reference torque signal setting unit which generates a reference signal which becomes high when the detected signal becomes high based on at least the signal detected from said steering torque sensor; a correction torque signal setting unit which generates a correction torque signal, which becomes high when the detected signal becomes high based on at least the signals detected from said revolution number sensor for the electric motor and from the vehicle speed sensor; and a target torque signal calculator which subtracts said correction torque signal from said reference torque signal to output a target torque signal to said electric motor; said controller also making said correction torque signal high when failure of the vehicle speed sensor is detected.

In this configuration, a large damping correction of the assist steering torque generated from the electric motor is made by making the correction torque signal high according to higher speed of the electric motor and vehicle speed at the time of normal mode when the electric motor (i.e., steering wheel) is revolved and the assist amount is reduced. Furthermore, the damping correction of the assist steering torque generated from the electric motor is made large by making the correction torque signal high regardless of an actual vehicle speed at the time of failure of the vehicle speed sensor.

Here, a reference torque signal setting unit generates a high reference torque signal for strong steering operation so that a large steering torque is generated (it is often seen at the low vehicle speed range). Therefore, a steering operation of a driver is greatly assisted by a larger assist steering torque even if the correction torque signal heightened due to vehicle speed sensor failure is subtracted from the high reference torque signal at the time of failure of the vehicle speed. Particularly, the driver is greatly assisted by the larger assist steering torque since the correction torque signal. becomes low for steering operation with the slow speed of the electric motor. Specifically, according to the configuration of the present invention, steering operation as seen at the low vehicle speed range is greatly assisted even if the vehicle speed sensor fails.

In contrast, the reference torque signal set unit generates a low reference torque signal for a weak steering operation so that a large torque is not generated (operation is often seen at the high vehicle speed range). Therefore, only a small assist steering torque is generated (generation of the assist steering torque in an opposite direction is also included) since a correction torque signal heightened due to failure of the vehicle speed sensor is subtracted from the low reference torque signal at the time of failure of the vehicle speed sensor. Therefore, a large assist steering torque is not generated and stability of the steering system (high speed stability) is secured even if such weak steering operation is performed at the high vehicle speed range at the time of failure of the vehicle speed sensor. Particularly, the assist steering torque becomes small for a steering operation in which the steering torque is small and the speed of the electric motor is fast. That is, according to the configuration of the present invention, the assist steering torque acts such that the steering system is stable even if a fast steering operation is performed at the high vehicle speed range.

Note that the term "damping correction" means that the correction of a signal is carried out in a direction opposing to the rotation direction of the steering wheel. Therefore, when the direction of steering torque and the rotating direction of the steering wheel are the same such as at the time of normal steering, the damping is subtraction correction. However, when the direction of steering torque is a direction opposed to the rotation of the steering wheel so that the steering wheel returns to a neutral position (self aligning torque etc.), the damping becomes an addition correction.

Take note that there are means to multiply the coefficient which increases the correction torque signal as a means to make the correction torque signal high and a means to input the high vehicle speed to the correction torque signal setting unit as a dummy vehicle speed as described in the embodiment of the invention.

According to the present invention, there is a configuration wherein said reference torque signal setting unit generates a reference torque signal based on the signal detected from the vehicle speed sensor in addition to the signal detected from the steering torque sensor under the condition that a small reference torque signal is generated in the case where the vehicle speed sensor detects a large signal in comparison with the case of a small signal being detected, and said controller makes said reference torque signal high when said vehicle speed sensor failure detection unit detects failure of the vehicle speed sensor.

According to this configuration, the reference torque signal setting unit (steering torque and vehicle speed response type) outputs a higher reference torque signal according to a lower vehicle speed signal if the steering torque signal is the same. Since the reference torque signal becomes high when failure of the vehicle speed sensor is detected, operation is preferably assisted, especially, at the low vehicle speed area at which an actual vehicle speed is low.

In each configuration, a storage device to store the previous vehicle speed and a deceleration detector which detects the degree of deceleration with reference to the current and previous vehicle speeds are provided and it is preferable to detect that failure arises when the previous vehicle speed is not less than a predetermined vehicle speed (20 km/h) and the degree of deceleration is not less than a predetermined value (2.5 G). This is because of deceleration having no possibility in braking operation. In is each configuration, a detector which detects the revolution number of the engine and a timer are provided and it is preferable to detect that failure arises when a value is not more than a predetermined revolution number of the engine (200 rpm) and the state of a vehicle speed=0 km/h is continued not less than a predetermined time (180 seconds). This is because there is no possibility of such a racing state in usual.

Further, it is preferable that the controller makes the reference torque signal and/or correction torque signal gradually higher by so called fadeout control in each configuration when it makes the reference torque signal and/or correction torque signal high at the time of failure of the vehicle speed sensor. This is because there is insecurity being given to a driver. Various methods are suggested as for the method of this fadeout.

According to the present invention, there is provided an electric power steering apparatus comprising: an electric motor which applies an assist steering torque to the steering system of a vehicle; a steering torque sensor which detects the manual steering torque of said steering system; a vehicle speed sensor which detects the vehicle speed of said vehicle; a revolution number sensor for said electric motor which detects the revolution number of said electric motor; a controller which generates a control signal for controlling said electric motor; and a driver which generates a driving signal for driving said electric motor based on said control signal. The controller possesses a reference torque signal setting unit which generates a reference signal which becomes high when the detected signal becomes high based on at least the signal detected from the steering torque sensor; a correction torque signal setting unit which generates a correction torque signal, which becomes high when the detected signal becomes high based on at least the signals detected from the revolution number sensor for the electric motor and from the vehicle speed sensor; and a target torque signal calculator which subtracts the correction torque signal from the reference torque signal to output a target torque signal to the electric motor. Also, in this embodiment, the power steering apparatus possesses a revolution number sensor for the engine which detects the revolution number of the engine and a vehicle speed 0 detection unit which detects that the vehicle speed is zero, and is configured so that the controller makes the correction torque signal high according to the signal detected from the revolution number sensor for the engine, when the vehicle speed 0 detection unit detects that the vehicle speed is zero.

In this configuration, a large damping correction of the assist steering torque generated from the electric motor is carried out by making the correction torque signal high according to higher speed of the electric motor and vehicle speed at the time of normal mode when the electric motor (i.e., steering wheel) is revolved and the assist amount is reduced. Furthermore, the controller makes the correction torque signal change according to at least the electric motor speed signal and the signal of the revolution number of the engine responding to the revolution number of the engine instead of the vehicle speed when the assist steering torque is damp—corrected. Take note that failure of the vehicle speed sensor is disconnection failure so as to output vehicle speed 0. Therefore, a countermeasure for the vehicle speed sensor can be taken without judgment whether or not the vehicle speed sensor fails in this configuration.

Here, a reference torque signal set unit generates a high reference torque signal for strong steering operation so as to generate a large steering torque with the decreased revolution number of the engine in the case where the degree of the signal detected from the vehicle speed sensor is vehicle speed. At the same time, the correction torque signal becomes low by the decreased revolution number of the engine (it is often seen at the low vehicle speed range). Therefore, steering operation often seen at the low vehicle speed range is greatly assisted by a large assist steering torque even if the detection signal from the vehicle speed sensor is vehicle speed 0 (e.g., even if the vehicle speed sensor fails). The driver can quickly perform the steering operation adequately without insecurity against steering operation since the revolution number of the engine is decreased at the low vehicle speed area (correction torque signal is low) even if steering operation at a high revolution number of the electric motor (sudden steering) is performed. That is, according to the configuration of this embodiment, the steering operation as seen at the low vehicle speed range is adequately assisted even if the signal detected from the vehicle speed sensor is vehicle speed 0.

Similarly, the reference torque signal setting unit generates a small reference torque signal for a weak steering operation so as to generate only a small steering torque with the increased revolution number of the engine (seen at the high vehicle speed range) when the signal detected from the vehicle speed sensor is vehicle speed 0. At the same time, the correction torque signal becomes high for a decreased revolution number of the engine. Therefore, the stability of the steering system (high vehicle speed stability) is secured without generating the large assist steering torque even if the signal detected from the vehicle speed sensor is vehicle speed 0 for a steering operation seen at the high vehicle speed range (e.g., vehicle speed sensor fails). Particularly, the assist steering torque becomes small for a steering operation at a small steering torque and at a high revolution number of the electric motor. That is, the assist torque acts so that the steering system is stable even if the signal detected from the vehicle speed sensor is vehicle speed 0 for a steering operation at the high vehicle speed range according to this embodiment.

Note that the term "damping correction" means that the correction of a signal in a direction opposed to the rotation direction of the steering wheel is made. Therefore, when the direction of steering torque and the rotating direction of the steering wheel are the same such as at the time of normal steering, the damping is subtraction correction. However, when the direction of steering torque is a direction opposed to the revolution of the steering wheel so that the steering wheel returns to a neutral position (self aligning torque etc.), the damping becomes an addition correction. Damping correction of the present invention greatly differs from the prior art. Influence of change in the revolution number of the engine not associated with the vehicle speed, which is a problem in the prior art, is less at the time of generating the correction torque signal and outputting the target torque signal. Therefore, a target value (target current) for the electric motor is set based on the steering torque signal and a signal of revolution number of the engine even if a negative portion of the response of revolution number of the engine is dampened and the steering feeling does not become worse.

According to the present invention, there is provided an electric power steering apparatus comprising: an electric motor which applies an assist steering torque to the steering system of a vehicle; a steering torque sensor which detects the manual steering torque of the steering system; a vehicle speed sensor which detects the vehicle speed of the vehicle; a revolution number sensor for the electric motor which detects the revolution number of the electric motor; a controller which generates a control signal for controlling the electric motor; and a driver which generates a driving signal for driving the electric motor based on the control signal. The controller possesses a reference torque signal setting unit which generates a reference signal which becomes high when the detected signal becomes high based on at least the signal detected from the steering torque sensor; a correction torque signal setting unit which generates a correction torque signal, which becomes high when the detected signal becomes high based on at least the signals detected from the revolution number sensor for the electric motor and from the vehicle speed sensor; and a target torque signal calculator which subtracts the correction torque signal from the reference torque signal to output a target torque signal to the electric motor. Also, in this embodiment, the power steering apparatus possesses a revolution number sensor for the engine which detects the revolution number of the engine and a vehicle speed sensor failure detection unit which detects failure of the vehicle speed sensor. The controller is configured to make the correction torque signal high according to the signal detected from the revolution number sensor for the engine, when the vehicle speed sensor failure detection unit detects failure of the vehicle speed sensor.

In this configuration, a large damping correction of the assist steering torque generated from the electric motor is carried out by making the correction torque signal high according to higher speed of the electric motor and vehicle speed at the time of normal mode including actual vehicle speed 0 when the electric motor (i.e., steering wheel) is revolved and the assist amount is reduced. Furthermore, the damping correction of the assist steering torque generated from the electric motor generates is carried out by making the correction torque signal change according to at least the electric motor speed signal and the signal of the revolution number of the engine responding to the revolution number of the engine instead of the vehicle speed when the assist steering torque is damp-corrected. In this configuration, response of the revolution number of the engine is controlled only at the time that the vehicle speed sensor fails. Therefore, the operation of this configuration is adequately assisted by large assist torque at the low vehicle speed range and steering system becomes stable since the large assist steering torque is not generated at the high vehicle speed range. Also, the steering feeling does not become worse.

Furthermore, in each configuration, a storage device which stores the previous vehicle speed and a damping speed detector which detects the degree of deceleration with reference to the current and previous vehicle speeds are provided in the vehicle speed sensor failure detection unit, and it is preferable that the vehicle speed sensor failure detection unit detects that failure arises when the previous vehicle speed is not less than a predetermined vehicle speed (20 km/h) and the degree of deceleration is not less then a predetermined value (2.5 G). This is because there is no possibility of deceleration in usual braking operation. In each configuration, a detector of the revolution number of the engine and a timer are provided in the vehicle speed sensor failure detection unit and it is preferable the vehicle speed sensor failure detection unit detects that failure when the case where the revolution number of the engine is not less than a predetermined value of the revolution number of the engine (2000 rpm) and a vehicle speed is 0 km/h is continued not less than a predetermined time (180 seconds). This is because there is usually no possibility of such racing state.

Further, in each configuration, it is preferable that the controller makes the reference torque signal and/or correction torque signal gradually higher by fadeout control when it makes the correction torque signal high according to the signal detected from the sensor of the revolution number of the engine by switching the correction torque signal into the signal detected from the vehicle speed sensor at the time of failure of the vehicle speed sensor. The driver does not then become insecure. Various methods are suggested as for the method of this fadeout.

BRIEF DESCRIPTION OF THE DRAWINGS

FIG. 4 is a circuit diagram of the electric motor driver.

FIG. 5 exemplifies maps possessed by the controller, wherein

DESCRIPTION OF THE PREFERRED EMBODIMENT

Figure 1:
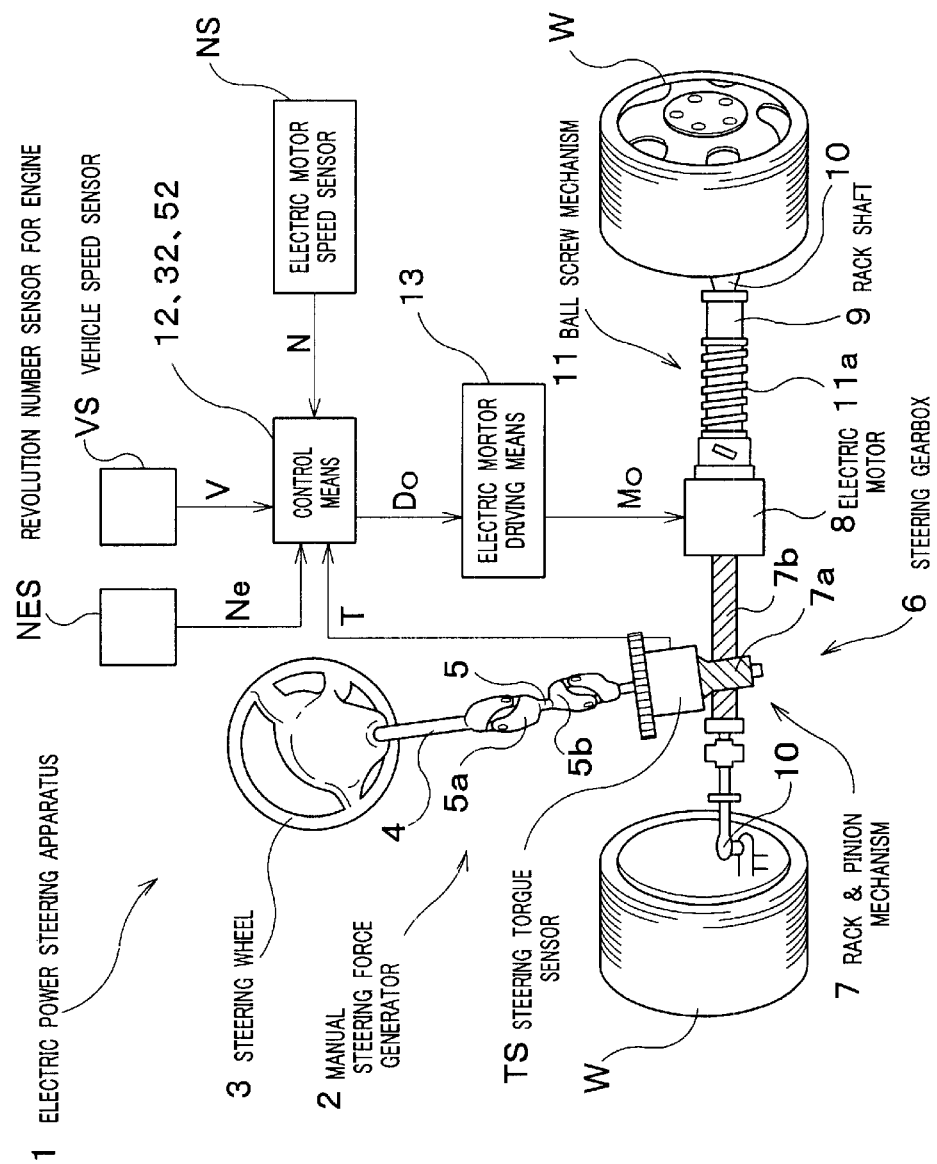
FIG. 1 is an entire configuration view totally showing the electric power steering apparatus according to the present invention.

Embodiments of the electric power steering apparatus according to the invention will now be described in detail by referring to the attached drawings, which are not intended to restrict the present invention.

The electric power steering apparatus according to the embodiment generates assist steering torque (assist steering force) as a driving force of an electric motor based on a manual steering torque, speed of the electric motor and a vehicle speed and assists the steering operation of a driver.

Thus, the electric power steering apparatus has a steering torque sensor for detecting manual steering torque (steering force) of the driver, a revolution speed sensor for the electric motor, which detects the rotation speed of the electric motor, and a vehicle speed sensor which detects the vehicle speed. Further, the electric power steering apparatus in the present embodiment has a controller which controls driving of the electric motor and an electric motor driver which generates an electric motor driving signal for driving the electric motor based on the electric motor control signal generated from the controller.

The controller has a reference torque signal setting unit which generates (outputs) a reference torque signal based on the steering torque signal and the vehicle speed signal, and a correction torque signal setting unit which generates (outputs) a correction torque signal based on a revolution number signal for the vehicle, the steering torque signal and the vehicle speed signal. Further, the controller has a target torque signal calculator for subtracting the correction torque signal from the reference torque signal to calculate a target torque signal. Furthermore, the controller has a steering state detector which detects a rotation state (go (forward: right rotation)/return (rearward: left rotation)) of the electric motor and a target torque signal switcher for switching the target torque signal based on the steering state. In addition, the controller has a control signal output unit for generating an electric motor control signal to control the electric motor based on target torque signal. Also, the controller has a vehicle speed sensor failure detection unit for detecting the failure of the vehicle speed sensor. The calculator (vehicle speed sensor failure detector) makes a reference torque signal high by outputting a low dummy vehicle speed signal to the reference torque signal setting unit and makes a correction torque signal high by outputting a high dummy vehicle speed to the correction of the torque signal setting unit.

The electric power steering apparatus has a vehicle speed 0 detection unit for detecting that a vehicle speed is 0 (vehicle speed 0). The electric power steering apparatus also makes the correction torque signal high according to the revolution number signal by switching correction torque signal into the revolution number signal.

First, the entire configuration of the electric power steering apparatus 1 is described referring to FIGS. 1 to 8.

Figure 2:
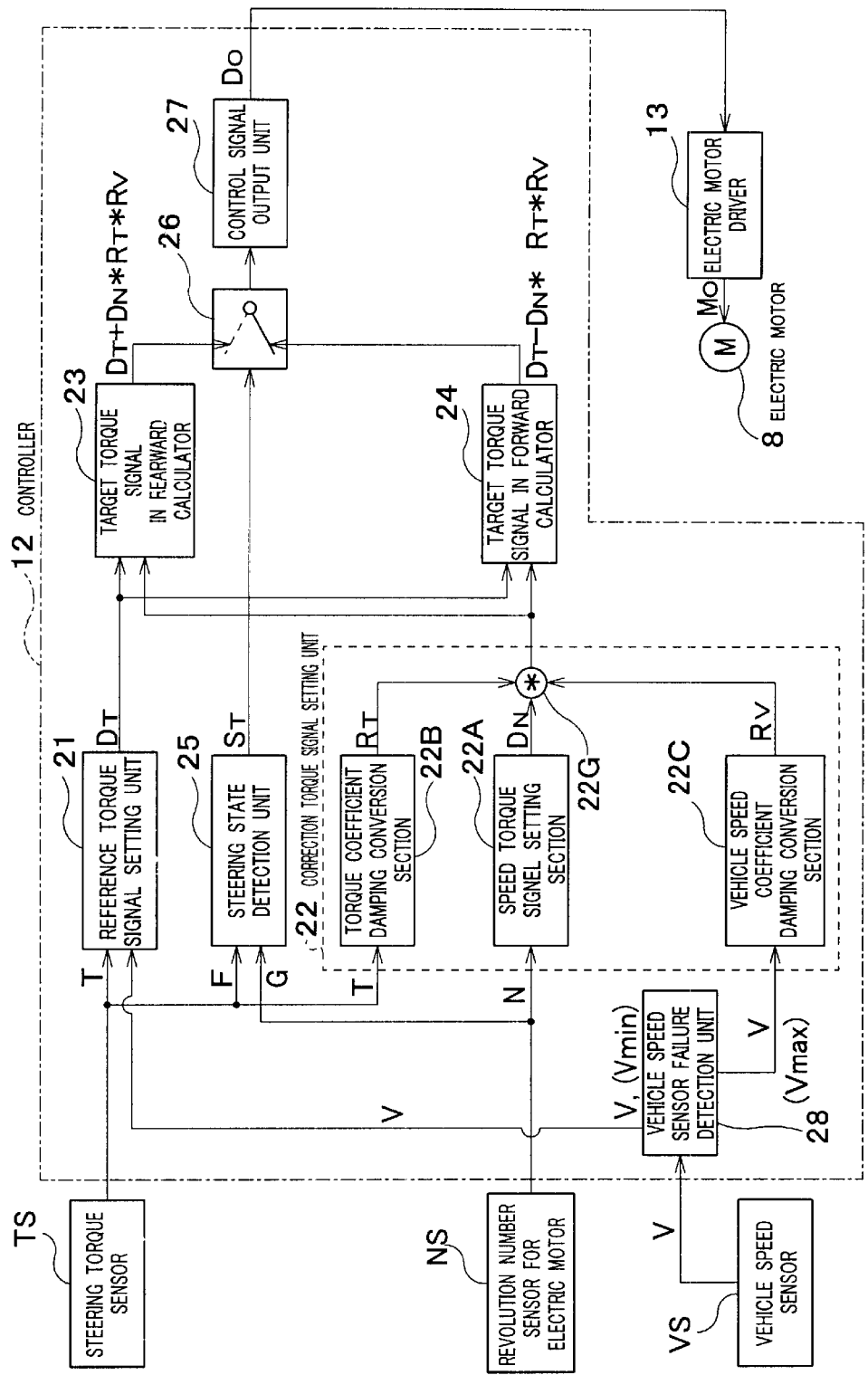
FIG. 2 is a block configuration diagram of the electric system of the electric power steering apparatus according to the first embodiment of the present invention.
Figure 3:
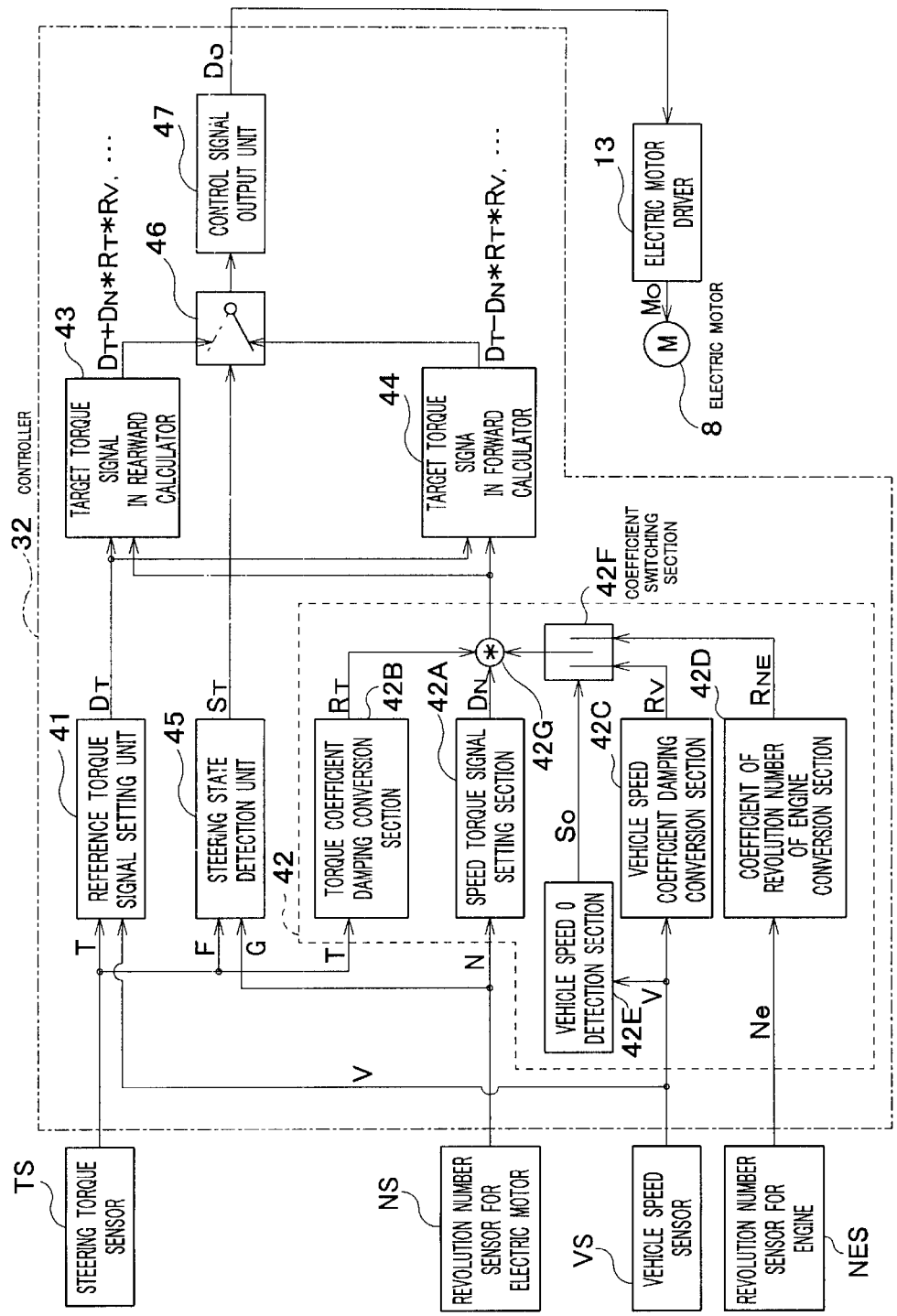
FIG. 3 is a block configuration diagram of the electric system of the electric power steering apparatus according to the second embodiment of the present invention.
Figure 5E:
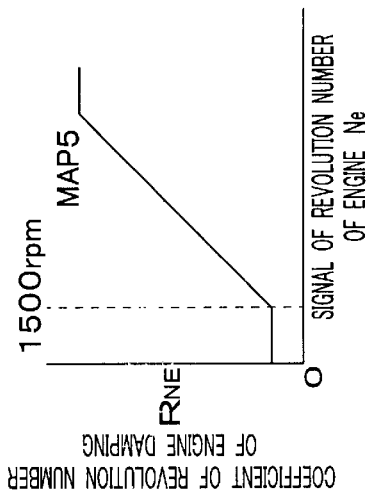
FIG. 5E is a map showing the signal of the revolution number of the engine and the coefficient of the revolution number damping (MAP 5).
Figure 5C:
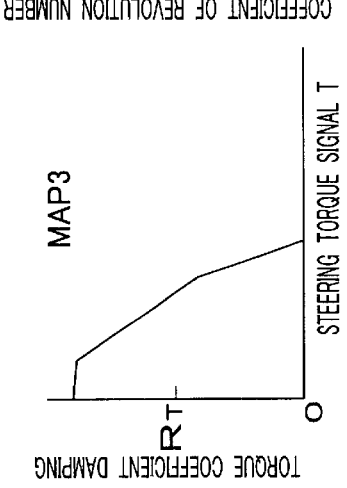
FIG. 5C is a map showing the relation between the steering torque signal and a torque coefficient damping (MAP 3)
Figure 5D:
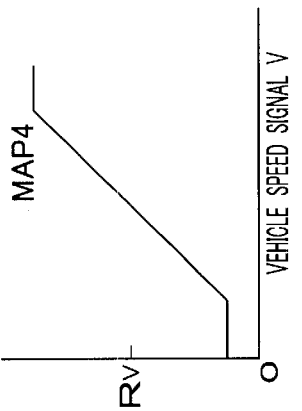
FIG. 5D is a map showing the relation between a vehicle speed signal and the vehicle speed coefficient damping (MAP 4)
Figure 5A:
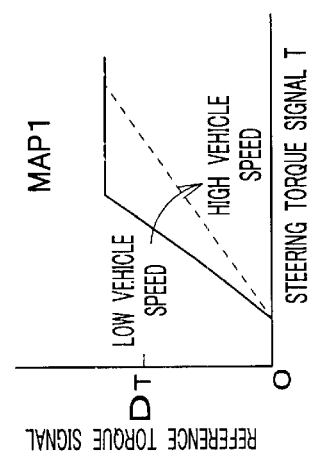
FIG. 5A is a map showing the relation between a steering torque signal and a reference torque signal (MAP 1)
Figure 5B:
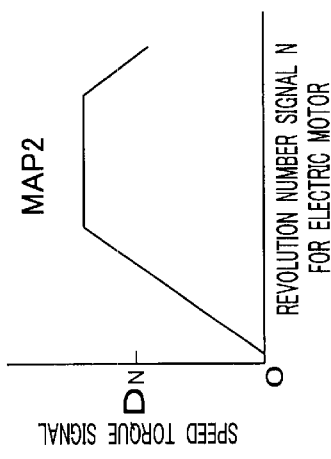
FIG. 5B is a map showing the relation between an revolution number signal for the vehicle and a speed torque signal (MAP 2)
Figure 6:
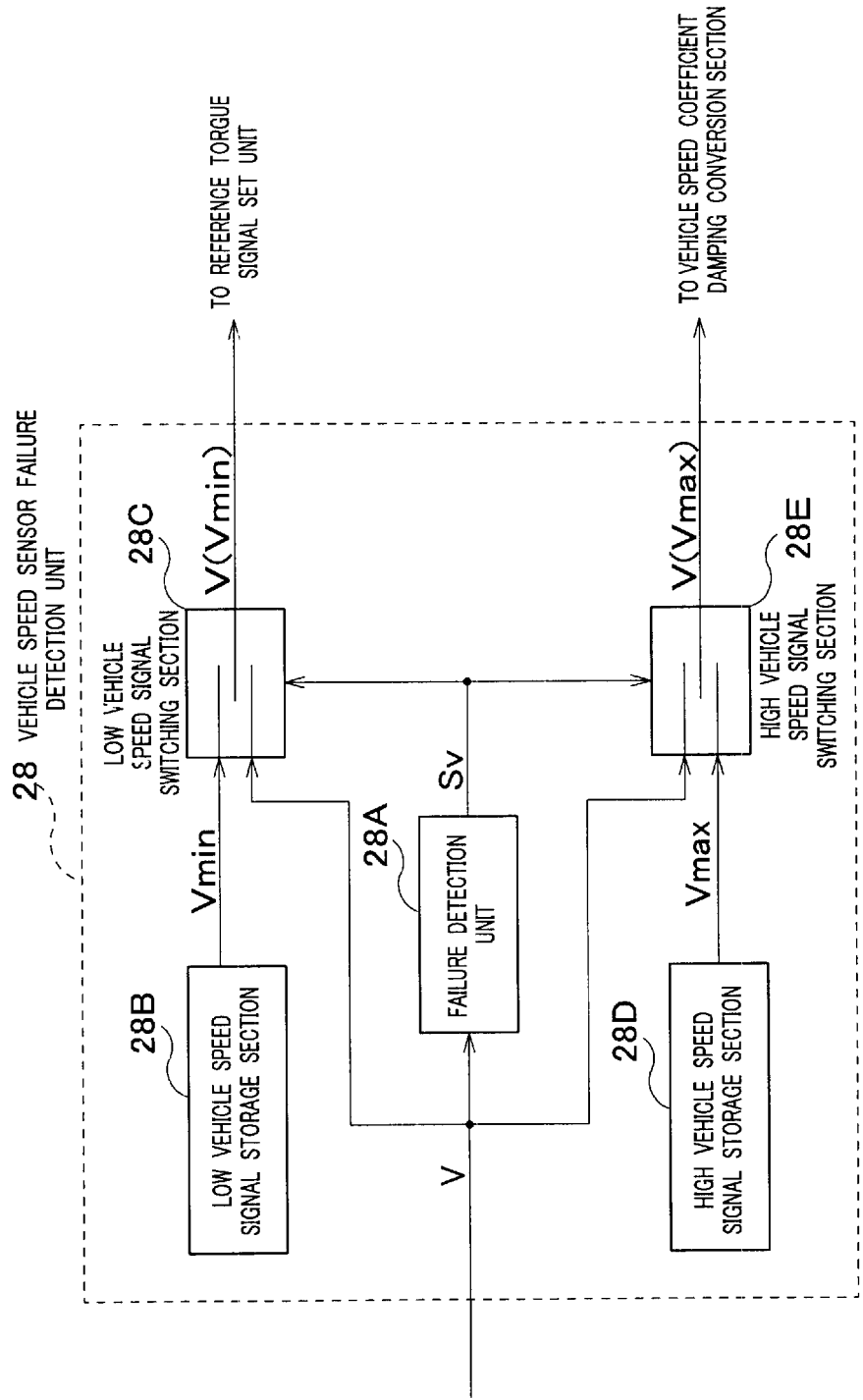
FIG. 6 is a block diagram of a vehicle speed sensor failure detection unit of FIG. 2.
Figure 7:
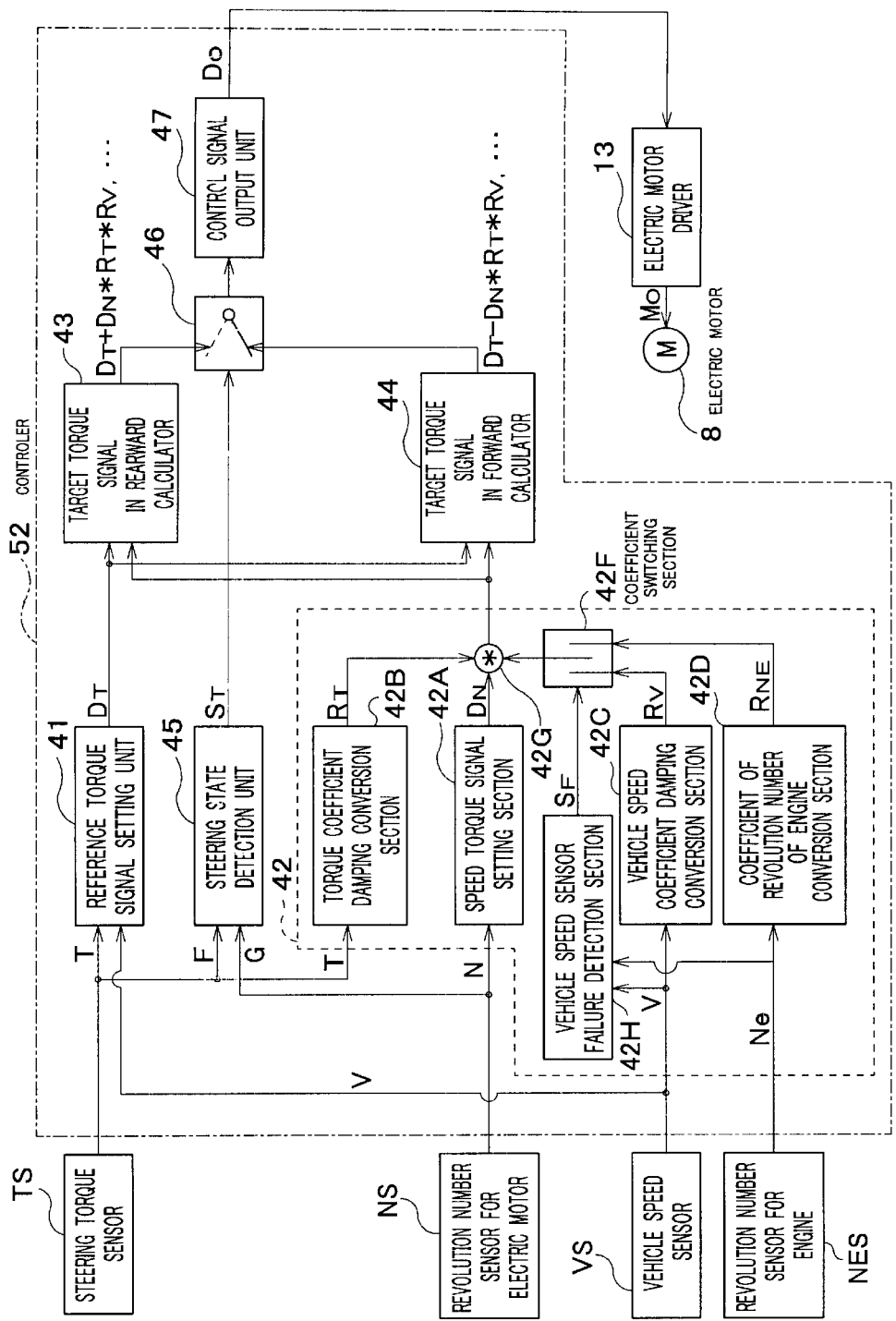
FIG. 7 is a block diagram of the electric system of the electric power steering apparatus in the third embodiment.
Figure 8:
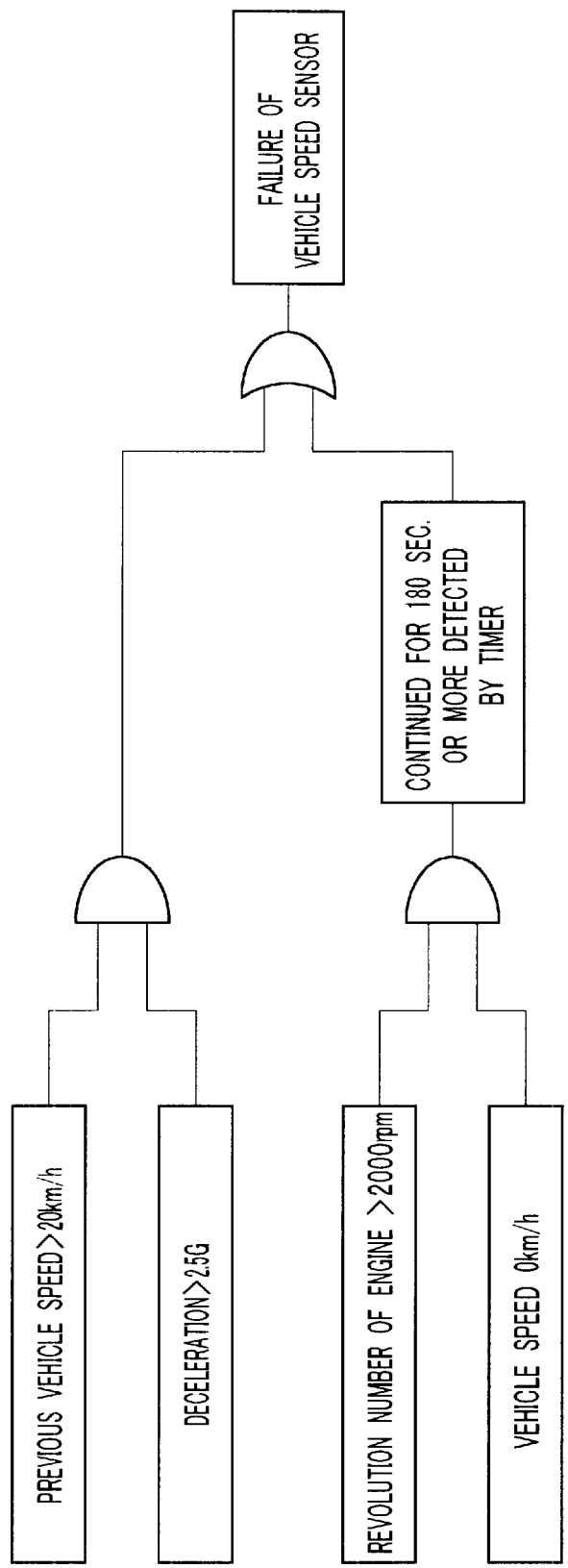
FIG. 8 is a vehicle speed sensor failure detection logic diagram for vehicle speed sensor detection unit in FIG. 7.
Figure 9:
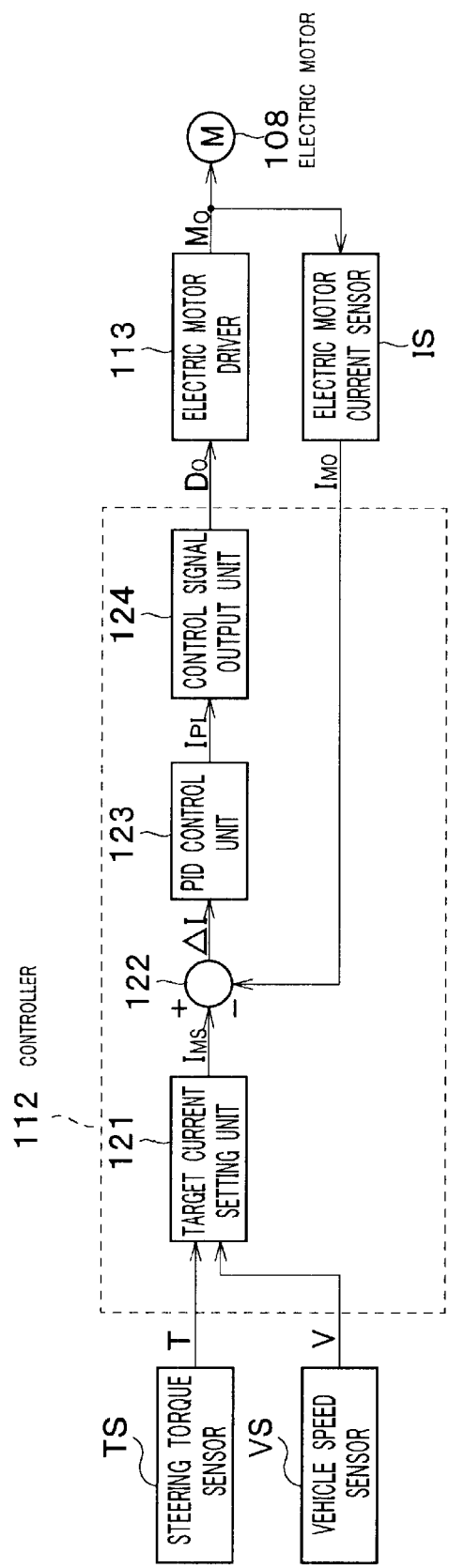
FIG. 9 is a block configuration diagram of the electric system of a conventional electric power steering apparatus.

FIG. 1 is an entire configuration view totally showing the electric power steering apparatus according to the present invention. FIG. 2 is a block configuration diagram of the electric system of the electric power steering apparatus according to the first embodiment of the present invention. FIG. 3 is a block configuration diagram of the electric system of the electric power steering apparatus according to the second embodiment of the present invention. FIG. 4 is a circuit diagram of the electric motor driver. FIG. 5 exemplifies maps possessed by the controller, wherein FIG. 5A is a map showing the relation between a steering torque signal and a reference torque signal (MAP 1); FIG. 5B is a map showing the relation between a revolution number signal for the vehicle and a speed torque signal (MAP 2); FIG. 5C is a map showing the relation between the steering torque signal and a torque coefficient damping (MAP 3); FIG. 5D is a map showing the relation between a vehicle speed signal and the vehicle speed coefficient damping (MAP 4); and FIG. 5E is a map showing of the signal of the revolution number of the engine and the coefficient of the revolution number damping (MAP 5). FIG. 6 is a block diagram of a vehicle speed sensor failure detection unit of FIG. 2. FIG. 7 is a block diagram of the electric system of the electric power steering apparatus in the third embodiment. FIG. 8 is a vehicle speed sensor failure detection logic diagram for the vehicle speed sensor detection unit in FIG. 7. Since there are three different controllers in the present invention, the configurations of these three controllers will be described separately. Also, the actuations of the electric power. steering apparatus will be described in all of the three embodiments.

An electric power steering apparatus 1 makes front wheels W, W turn with manual steering by manual steering force generator (steering system) 2 at the time of operating a steering wheel 3 by a driver to change the direction of the vehicle as shown in FIG. 1. Further, the electric power steering apparatus 1 generates an electric motor driving signal in a electric motor driver 13 based on an electric motor control signal $D_o$ from the controller 12, 32, or 52, drives an electric motor 8 with this electric motor driving signal to generate an assist steering torque (assist steering force) and reduces the steering torque (manual steering force) by a manual steering force generator 2.

In the manual steering force generator 2, a pinion 7a of a rack & pinion mechanism 7 provided in a steering gearbox 6 via a connecting shaft 5 is connected to a steering shaft 4 integrated with the steering wheel 3. Further, a connecting shaft 5 has free connections 5a, 5b at both ends thereof. A rack tooth 7b engaged with the pinion 7a of the rack & pinion mechanism 7 is formed at a rack shaft 9 and the revolution of the pinion 7a results in return movement of the rack shaft 9 in a sideways direction by engaging pinion 7a with the rack tooth 7b. Further, right and left wheels W, W as turn wheels are connected to both ends of the rack shaft 9 via tie rods 10, 10.

The electric motor 8 is provided coaxially with the rack shaft 9 in the electric power steering apparatus 1 to generate the assist steering torque. The revolution of the electric motor 8 is converted into a thrust via a ball screw mechanism 11 provided coaxially with the rack shaft 9 and this thrust acts on the rack shaft 9 (ball screw shaft 11a).

Signals T, N, V and Ne respectively detected from the steering torque sensor TS, the revolution number sensor NS for the electric motor, the vehicle speed sensor VS, and the revolution number sensor NES of the engine are input to controller 12, 32, or 52. The controller 12, 32, or 52 generates the electric motor control signal $D_o$ (direction signal+PWM signal) respectively based on the detected signal T, N, V or Ne and outputs it to the electric motor driver 13. The electric power steering apparatus 1 in this embodiment varies the electric motor control signal DO based on the steering state (go/return) and varies the electric motor control signal $D_o$ even at the time of failure of the vehicle speed sensor VS. The details of the controller 12, 32, or 52 will be described later on.

The steering torque sensor TS accommodated within the steering gearbox 6 detects a magnitude and a direction of the steering torque (manual steering force) of the driver. The steering torque sensor TS also outputs the steering torque signal T corresponding to the detected steering torque to the controller 12, 32, or 52.

The revolution number sensor NS of the electric motor comprises an electric motor current detector (not shown) and an electric motor voltage detector (not shown) for the detection electric motor current sent to the electric motor 8 and electric motor voltage applied to electric motor 8, and a calculator which calculates the revolution number of the electric motor 8 based on the electric motor current and the electric motor voltage. The known means instead of means described above may be used. The calculator which calculates the revolution number of the electric motor 8 calculates the revolution number [N] of the electric motor N] based on following equation (1):

$$N=(V_M-I_M*R_M)\qquad(1)$$

wherein N is a revolution number of the electric motor, $V_M$ is an electric motor voltage, $I_M$ is an electric motor current, $R_M$ is an electric motor resistance, and K is an induction voltage constant.

In this equation (1), since the electric motor resistance $(R_M)$ and the induction voltage constant [K] are constant for every electric motor, the electric motor speed [N] can be calculated by substituting the electric motor current $[V_M]$ and the electric motor voltage $[I_M]$ into the equation (1). The revolution number [N] of the electric motor calculated as described above is output to the controller 12, 32, or 52 as a revolution number signal N of the electric motor. The revolution number sensor NS of the electric motor may be a revolution number sensor of the steering which detects the revolution number of the steering shaft 4.

The vehicle speed sensor VS outputs the vehicle speed signal V based on the revolution number of the output shaft in a transmission (not shown) to the controller 12, 32, or 52.

The revolution number sensor NES of the engine outputs a revolution number signal Ne of the engine based on the revolution number of the output shaft of the engine (not shown) to controller 12, 32, or 52.

The electric motor driver 13 supplies an electric motor driving signal based on the electric motor control signal $D_o$ output from the controller 12, 32, or 52 to the electric motor 8 in order to drive the electric motor 8. The electric motor driver 13 comprises, for example, a bridge circuit 13a having switching elements of four electric field effect transistors (hereinafter referred to as "power FET") 13a1, 13a2, 13a3, 13a4, and a gate driving circuit 13b as shown in FIG. 4. When the electric motor control signal $D_o$ (direction signal+PWM signal) is input to the gates G1, G2, G3, G4, which respectively corresponds to power FET 13a1, 13a2, 13a3, 13a4, the electric motor driving signal is supplied to the electric motor 8 based on the electric motor control signal $D_o$. Then, the electric motor current is sent to the electric motor 8, and the electric motor 8 generates an assist steering torque proportioned to the electric motor current and assists the steering operation of the driver.

[First Embodiment]

Next, the configuration of controller 12 will be described by referring to FIG. 2 in more detail.

The controller 12 includes a reference torque signal setting unit 21, a correction torque signal setting unit 22, a target torque signal in rearward (in left rotating direction) calculator 23, a target torque signal in forward (in right rotating direction) calculator 24, a steering state detection unit 25, a signal switching unit 26, a control signal output unit 27, and a vehicle speed sensor failure detection unit 28.

Amongst them, the correction torque signal setting unit 22 is to set an amount of the correction (dampened amount) when damping correction is performed and includes a speed torque signal setting section 22A, a torque coefficient damping conversion section 22B, a vehicle speed coefficient damping conversion section 22C, and a multiplication section 22D.

A steering torque signal T, a revolution number signal N of the electric motor, or a vehicle speed signal V is input to the controller 12; and each signal is input by an A/D converter (not shown) as a digitalized signal. Further, the controller 12 has a direction judgment unit (not shown), and generates a direction flag F (right 1, left D) showing the direction of the steering torque signal T from the steering torque signal T and a direction flag G (right 1, left 0) showing the direction of the revolution number signal N of the electric motor from the revolution number signal of the electric motor N.

The reference torque signal setting unit 21 comprises ROM and logic circuit etc. (not shown) and stores data set based on experimental results or logic calculation, for example, steering torque signal T corresponding to the reference torque signal DT as shown in map 1 in FIG. 5A. When the steering torque signal T is input, the reference torque signal setting unit 21 instantaneously reads out the reference torque signal $D_T$ corresponding to the input signal, and outputs the read signal to the target torque signal in the reverse calculator 23 and the target torque signal in the forward calculator 24 at later stage. Map 1 is composed of a map at low vehicle speed (e.g., 0 km/h) shown as a solid line in FIG. 5A and a map at high vehicle speed (e.g., 255 km/h) as a dashed line in FIG. 5A. The reference torque signal setting unit 21 reads out vehicle speed signal V from the vehicle speed sensor VS and sets the reference torque signal $D_T$ based on the steering torque signal T and the vehicle speed signal V by proportionally allocating the values obtained from both maps with the vehicle speed signal V. A higher the reference torque signal $D_T$ is set (generated) according to a higher steering torque signal T. Further, a lower reference torque signal $D_T$ is set (generated) according to higher vehicle speed signal V if magnitude of steering torque signal T is the same.

The speed torque signal setting set section 22A of the correction torque signal setting unit 22 comprises a ROM, etc. (not shown) and stores data set based on experimental results or logic calculation, for example the revolution number signal N of the electric motor corresponding to the speed torque signal $D_N$ as shown in map 2 of FIG. 5B. When the revolution number signal N of the electric motor is input, the speed torque signal setting section 22A instantaneously reads out the speed torque signal $D_N$ based on the input signal N, and outputs a read signal to multiplication section 22G at a later stage. Note that when the revolution number signal N of the electric motor increases not less than a predetermined value, the speed torque signal $D_N$ decreases in this map 2. This is because urgent avoidance action by a driver becomes easy.

The torque coefficient damping conversion section 22B of the correction torque signal setting unit 22 comprises a ROM, etc. (not shown) and stores a data set based on experimental results or logic calculation, for example, the steering torque signal T corresponding to the torque coefficient damping RT as shown in map 3 in FIG. 5C. When the steering torque signal T is input, the torque coefficient damping conversion section 22B instantaneously reads out the torque coefficient damping RT based on the input signal T, and outputs the read signal to multiplication section 22G at the later stage. The torque coefficient damping conversion section 22B is intended not to reduce the assist amount of the assist steering torque by reducing the amount of damping correction when the steering torque signal T increases.

The vehicle speed coefficient damping conversion section 22C of the correction torque signal setting unit 22 comprises a ROM, etc. (not shown) and stores a data set based on experimental results or logic calculation, for example, the vehicle speed signal V corresponding to the vehicle speed coefficient damping RV as shown in map 4 in FIG. 5D. When the vehicle speed signal V is input, the vehicle speed coefficient damping conversion section 22C instantaneously reads out the vehicle speed coefficient damping RV based on the input signal V, and outputs the read signal to the coefficient switching section 22F at the later stage. The vehicle speed coefficient damping conversion section 22C is intended to reduce the assist amount of the assist steering torque by increasing the amount of damping correction when the vehicle speed signal V increases.

The multiplication section 22D of correction torque signal setting unit 22 comprises a multiplication section or multiplication function controlled by a software (not shown). The multiplication section 22G inputs the revolution number torque signal $D_N$ output from the revolution number torque signal setting section 22A, the torque coefficient damping $R_V$ output from the torque coefficient damping conversion section 22B, and the vehicle speed coefficient damping $R_V$ output from the vehicle speed coefficient damping conversion section 22C to multiply and to output the correction signal ($D_N*R_T*R_v$) to the target torque signal in reverse calculator 23 and the target torque signal in forward calculator 24.

The target torque signal in reverse calculator 23 has an adder or an addition function controlled by a software (not shown). The target torque signal in reverse calculator 23 adds (subtracts) the correction torque signal ($D_N*R_T*R_v$) to the reference torque signal $D_T$ to generate an adequate assist steering torque in the electric motor 8 when the steering wheel 3 returns and outputs the target torque signal ($D_T+D_N*R_T*R_v$), which is the results of the addition, to the signal switching unit 26 at the later stage.

The target torque signal in forward calculator 24 has a subtractor or subtraction function controlled by a software (not shown). The target torque signal in forward calculator 24 subtracts (dampens) the correction torque signal ($D_N*R_T*R_v$) from the reference torque signal $D_T$ to generate an adequate assist steering torque in the electric motor 8 when steering wheel 3 turns and outputs the target torque signal ($D_T-D_N*R_T*R_v$), which is the results of the subtraction, to the signal switching unit 26 at the later stage.

The steering state detection unit 25 comprises a logic circuit etc. (not shown); detects the going state or the returning state of the steering wheel 3 based on the direction flag F of the steering torque signal T and the direction flag G of the revolution number signal N of the electric motor; and outputs the steering state signal ST being switched into an H level or an L level, e.g., the H level at the going state of the steering wheel 3 and the L level at the returning state of the steering wheel 3, to the signal switching unit 26. The steering state detection unit 25 judges that the state is the going state (the steering wheel 3 moves in the direction where the steering wheel 3 is hard to turn by the driver) in the case where the direction of the direction flag F is consistent with the direction of the direction flag G and that the state is the returning state (the steering wheel 3 moves in the direction where the steering wheel 3 returns by the self aligning torque etc.) in the case where the direction of the direction flag F is not consistent with the direction of the direction flag G.

The signal switching unit 26 has a switching function (not shown); and inputs the target torque signal ($D_T+D_N*R_T*R_V$) from the target torque signal in reverse calculator 23, the target torque signal ($D_T-D_N*R_T*R_v$) from the target torque signal in forward calculator 24, and the steering state signal $S_T$ from the steering state detection unit 25. The signal switching unit 26 outputs the target torque signal ($D_T-D_N*R_T*R_v$) of the going state in the case where the steering state signal $S_T$ is the H level and the target torque signal ($D_T+D_N*R_T*R_V$) of the returning state in the case where the steering state signal $S_T$ is the L level to the control signal output unit 27 at the later stage.

The control signal output unit 27 comprises a PWM signal generator and a logic circuit (not shown), generates the electric motor control signal $D_o$ (direction signal+PWM signal) such that the deviation becomes zero by obtaining the deviation of the target torque signal ($D_T+D_N*R_T*R_V$) or the target torque signal ($D_T-D_N*R_T*R_v$) and the electric motor current signal from an electric motor current detector (not shown); and by processing the proportion, the integration, and the deviation, and outputs it to the electric motor controller 13 at the later stage.

Next, the vehicle speed sensor failure detection unit 28 will be described. The vehicle speed sensor failure detection unit 28 inputs the vehicle speed signal V (digitalized signal) from the vehicle speed sensor VS and outputs a low vehicle speed signal $V_{min}$ to the reference torque signal setting unit 21C when any failure of the vehicle speed sensor VS is detected. At the same time, the vehicle speed sensor failure detection unit 28 outputs a high vehicle speed signal $V_{max}$, to the vehicle speed reduction coefficient conversion section 22C when any failure of vehicle speed sensor VS is detected. The vehicle speed sensor failure detection unit 28 includes a failure detection section 28A, a low vehicle speed signal storage section 28B, a low vehicle speed signal switching section 28C, a high vehicle speed signal storage section 28D, and a high vehicle speed signal switching section 28E as shown in FIG. 6.

The failure detection section 2 8A comprises a ROM, a temporary storage memory, a logic circuit and the like (not shown). Also, any failure of the vehicle speed sensor detected is based on the vehicle speed sensor failure detection logic shown in FIG. 8. There are two cases where the failure detection section 28A judges "vehicle, speed sensor failure" in this logic: (1) One case is that previous vehicle speed is not less than 20 km/h and the deceleration is not less than 2.5 G and (2) the other case is that the state where the revolution number of the engine is not less than 2000 rpm and the vehicle speed is 0 km/h is continued not less than 180 seconds. In the former case (1), the failure detection unit 28A judges that the vehicle speed sensor failure arises because there is deceleration, which cannot be brought about in a usual braking operation. In the later case (2), the failure detection unit 28A judges that the vehicle speed sensor failure arises, because there is racing which cannot be seen in usual state. The failure detection section 28A outputs the failure signal $S_V$ to a low vehicle speed signal switching section 28C and a high vehicle speed signal switching section 28E. The failure signal $S_V$ is switched from the signal of the L level into the signal of the H level when the vehicle speed sensor VS fails. The failure detection section 28A has a comparator to compare the vehicle speed with a reference value (20 km/h), a deceleration detector for detecting deceleration, and a comparator to compare the deceleration with a reference value (2.5 G) (not shown). Further, the failure detection section 28A has a comparator to compare the revolution number of the engine with a reference value (2000 rpm), a comparator to compare the vehicle speed with a reference value (0 km/h), and a timer and the like (not shown).

The low vehicle speed signal storage section 28B comprises a ROM (not shown). The low vehicle speed signal storage section 28B outputs the low vehicle speed signal $V_{min}$ being used, to be switched when the vehicle speed sensor VS fails, to the low vehicle speed signal switching section 28C at the later stage. The low vehicle speed signal $V_{min}$ is a dummy vehicle speed different from the actual vehicle speed and is set at a low value, such as not more than 10 km/h. The value is adequately set by taking account of maps 1 and 4 in FIGS. 5A and 5D as the low vehicle speed signal $V_{min}$.

The low vehicle speed signal switching section 28C has a switching function (not shown) and inputs the vehicle speed signal V from the vehicle speed sensor VS, the low vehicle speed signal $V_{min}$ from the low vehicle signal storage section 28B, and the failure signal $S_V$ from the failure detection section 28A. The low vehicle speed signal switching section 28C outputs the vehicle speed signal V in the case where the failure signal SV is at the L level and the low vehicle speed signal $V_{min}$ in the case where the failure signal $S_V$, is at the H level to the reference torque signal setting unit 21 at the later stage as the vehicle speed signal V.

The high vehicle speed signal storage section 28D comprises a ROM (not shown). The high vehicle speed signal storage section 28D outputs the high vehicle speed signal $V_{max}$ being used to be switched when the vehicle speed sensor VS fails, to the low vehicle speed signal switching section 28E. The high vehicle speed signal $V_{max}$ is a dummy vehicle speed different from the actual vehicle speed and is set at a high value, such as 255 km/h. The value is adequately set by taking account of maps 1 and 4 in FIG. 5A and 5D as the high vehicle speed signal $V_{max}$.

The high vehicle speed signal switching section 28E comprises a switching function (not shown) and inputs the vehicle speed signal V from the vehicle speed sensor VS, the high vehicle speed signal $V_{max}$ from the high vehicle speed signal storage section 28D, and the failure signal $S_V$ from the failure detection section 28A. The high vehicle speed signal switching section 28E outputs the vehicle speed signal V in the case where the failure signal $S_V$ is at the L level and the high vehicle speed signal $V_{max}$ in the case where the failure signal $S_V$ is at the H level to the vehicle speed coefficient damping conversion section 22C as the vehicle speed signal V.

The failure can accurately be detected by the vehicle speed sensor failure detection unit 28. In addition, the reference torque signal and correction torque signal can be high when any failure is detected.

The operation of the power steering apparatus due to the controller 12 according to the first embodiment having the configuration described above will now be described by suitably referring to FIGS. 1, 2, 4, 5A to 5E, 6, and 8.

The reference torque signal setting unit 21 generates the reference torque signal $D_T$ based on the steering torque signal T and the actual vehicle speed V at the normal mode where the vehicle speed sensor VS does not fail, whereby a higher assist steering torque signal is generated according to a larger steering torque signal T. A larger assist steering torque is generated according to a lower vehicle speed signal V if the levels of the steering torque signal T is the same.

The correction torque signal setting unit 22 generates the correction torque signal $(D_N*R_T*R_v)$ based on the revolution number signal N of the electric motor, the steering torque signal T, and the vehicle speed signal V at the normal mode where the vehicle speed sensor VS does not fail, whereby a dampened amount of the assist steering torque becomes larger according to the higher revolution number signal N of the electric motor. Also, a dampened amount of the assist steering torque becomes smaller according to a higher steering torque signal T. Further a dampened amount of assist steering torque becomes larger according to a higher vehicle speed signal V.

Here, it is assumed that the vehicle speed signal becomes zero due to the disconnection or failure of the vehicle speed sensor VS. The reference torque signal setting unit 21 generates a high reference torque signal $D_T$ regardless of the actual vehicle speed, when the steering operation is performed to output it. At the same time, the correction torque signal setting unit 22 generates the correction torque signal $(D_N*R_T*R_vR_{NE})$ based on the signal of the revolution number of the engine Ne to output it. For this reason, at a high vehicle speed range where the reaction force from the road surface is weak, a large steering torque is generated, resulting in poor stability of the steering system.

However, in the electric power steering apparatus 1 of this embodiment, even if the vehicle speed sensor VS is disconnected and fails, and the vehicle speed signal V becomes zero, the vehicle speed sensor failure detection unit 28 accurately judges that the vehicle speed sensor VS fails. The vehicle speed sensor failure detection unit 28 outputs a low vehicle speed signal $V_{min}$ to the torque signal setting unit 21 as a dummy vehicle speed and makes the reference torque signal $D_T$ high. At the same time, the vehicle speed sensor failure detection unit 28 outputs a high vehicle speed signal $V_{max}$ to the vehicle speed coefficient damping conversion unit 22C as a dummy vehicle speed and makes the correction torque signal $(D_N*R_T*R_v)$ high.

Hereby, the driver is greatly assisted for steering operation at a low vehicle speed range (steering operation requiring large steering torque as seen at a low vehicle speed range) by large assist steering torque (due to a reference torque signal $D^T$ becoming high). Therefore, light steering operation can be performed at a low vehicle speed area. On the other hand, since the assist steering torque is greatly reduced for steering operation at a high vehicle speed range (steering operation requiring small steering torque as seen at a high vehicle speed range), the steering system becomes stable and high speed running is available with stability. Since the assist steering torque is greatly dampened for steering operation where the steering torque is small and the electric motor speed is high, high speed running with more stability is available.

In the case where the vehicle speed signal about middle level (middle vehicle speed signal) is generated as a dummy vehicle speed and it is output to the reference torque signal setting unit 21 and the vehicle speed coefficient reduction conversion unit 22C, the assist steering torque is insufficient at low vehicle speed range and steering system becomes unstable at high vehicle speed range as in the case of the prior art.

[Second Embodiment]

Next, the configuration of the controller 32 will be described by referring to FIG. 3 in more detail.

The controller 32 includes a reference torque signal setting unit 41, a correction torque signal setting unit 42, a target torque signal in rearward (in left rotating direction) calculator 43, a target torque signal in forward (in right rotating direction) calculator 44, a steering state detection unit 45, a signal switching unit 46, and a control signal output unit 47.

The correction torque signal setting unit 42 is to set an amount of the correction (dampened amount) when the damping correction is performed and includes a revolution speed torque signal setting section 42A, a torque coefficient damping conversion section 42B, a vehicle speed coefficient damping conversion section 42C, a coefficient of revolution number of the engine damping conversion section 42D, a vehicle speed 0 detection section 42E, a coefficient switching section 42F, and a multiplication section 42G.

A steering torque signal T, a revolution number signal N of the electric motor, or a vehicle speed signal V is input to the controller 42; and each signal is input by an A/D converter (not shown) as a digitalized signal. Further, the controller 32 has a direction judgment unit (not shown), and generates a direction flag F (right 1, left D) showing the direction of the steering torque signal T from the steering torque signal T and a direction flag G (right 1, left 0) showing the direction of the revolution number signal N of the electric motor from the revolution number signal of the electric motor N.

The reference torque signal setting unit 41 comprises a ROM and logic circuit, etc. (not shown) and stores a data set based on experimental results or a logic calculation, for example, a steering torque signal T corresponding to the reference torque signal $D_T$ as shown in map 1 in FIG. 5A. When the steering torque signal T is input, the reference torque signal setting unit 41 instantaneously reads out the reference torque signal $D_T$ corresponding to the input signal, and outputs the read signal to the target torque signal in reverse calculator 43 and the target torque signal in forward calculator 44 at the later stage. Map 1 is composed of a map at low vehicle speed (e.g., 0 km/h) shown as a solid line in FIG. 5A and a map at high vehicle speed (e.g., 255 km/h) as a dashed line in FIG. 5A. The reference torque signal setting unit 21 reads out the vehicle speed signal V from the vehicle speed sensor VS and sets the reference torque signal $D_T$ based on the steering torque signal T and the vehicle speed signal V by proportionally allocating the values obtained from both maps with the vehicle speed signal V. A higher reference torque signal $D_T$ is set (generated) according to a higher steering torque signal T. Further, a lower reference torque signal $D_T$ is set (generated) according to a higher vehicle speed signal V if the magnitude of the steering torque signal T is the same.

The speed torque signal setting set section 42A of the correction torque signal setting unit 42 comprises a ROM, etc. (not shown) and stores a data set based on experimental results or a logic calculation, for example, the revolution number signal N of the electric motor corresponding to the speed torque signal $D_N$ as shown in map 2 of FIG. 5B. When the revolution number signal N of the electric motor is input, the speed torque signal setting section 42A instantaneously reads out the speed torque signal DN based on the input signal N, and outputs read signal to multiplication section 42G at the later stage. Note that when the revolution number signal N of the electric motor increases not less than a predetermined value, the speed torque signal $D_N$ decreases in this map 2. This is because urgent avoidance action by the driver becomes easy.

The torque coefficient damping conversion section 42B of correction torque signal setting unit 42 comprises a ROM, etc. (not shown) and stores a data set based on experimental results or a logic calculation, for example, the steering torque signal T corresponding to the torque coefficient damping RT as shown in map 3 in FIG. 5C. When the steering torque signal T is input, the torque coefficient damping conversion section 42B instantaneously reads out the torque coefficient damping RT based on the input signal T, and outputs the read signal to multiplication section 42G at the later stage. The torque coefficient damping conversion section 42B is intended not to reduce the assist amount of the assist steering torque by reducing the amount of damping correction when the steering torque signal T increases. Since the torque coefficient damping $R_T$ increases when the steering torque signal T decreases, the steering system 2 is stable without generating any large assist steering torque at high vehicle speed.

The vehicle speed coefficient damping conversion section 42C of correction torque signal setting unit 42 comprises a ROM, etc. (not shown) and stores a data set based on experimental results or a logic calculation, for example, the vehicle speed signal V corresponding to the vehicle speed coefficient damping RV as shown in map 4 in FIG. 5D. When the vehicle speed signal V is input, the vehicle speed coefficient damping conversion section 42C instantaneously reads out the vehicle speed coefficient damping RV based on the input signal V, and outputs the read signal to the coefficient switching section 42F at the later stage. The vehicle speed coefficient damping conversion section 42C is intended to reduce the assist amount of assist steering torque by increasing the amount of damping correction when the vehicle speed signal V increases.

The coefficient of the revolution number of the engine damping conversion section 42D of the correction torque signal setting unit 42 comprises a ROM, etc. (not shown), and stores a data set based on experimental results or a logic calculation, for example, the signal N of the revolution number of the engine corresponding to the coefficient of the revolution number of the engine damping $R_{NE}$ as shown in map 5 in FIG. 5E. When the signal of the revolution number of the engine Ne is input, the coefficient of the revolution number of the engine damping conversion section 42D instantaneously reads out the coefficient of the revolution number of the engine damping $R_{NE}$ based on input signal Ne, and outputs the read signal to the coefficient switching section 42F at the later stage. The coefficient of the revolution number of the engine damping conversion section 42D is intended to reduce the assist amount of the steering torque by increasing the amount of damping correction when the signal of the revolution number of the engine Ne increases at the time that vehicle speed being 0 is detected. An increased value from 1500 rpm takes into account the first idle at the time of heating. It is preferable that the coefficient of maps (coefficient of the revolution number of the engine damping RNE) to be output is set at a value higher than that of the coefficient of map 4 (vehicle speed coefficient damping RV), since the damping correction is performed at the time that the vehicle speed is detected to thereby increase the stability of steering system 2.

The vehicle speed 0 detection section 42E of the correction torque signal setting unit 42 comprises a logic circuit, ROM and a comparison function (not shown) and outputs the vehicle speed 0 signal $S_0$ of H level based on the vehicle speed signal V when the vehicle speed signal V is 0 (vehicle speed 0 km/h) and the vehicle speed 0 signal $S_0$ of L level when the vehicle speed signal V is not 0 to the coefficient switching section 42F. Here, the case where the vehicle speed signal V becomes 0 (i.e., the vehicle speed 0 signal $S_0$ of H level is output) is the case where the vehicle speed is actually 0 km/h and the case where the vehicle speed sensor VS fails (the vehicle speed signal V becomes zero when the vehicle speed sensor VS fails).

The coefficient switching section 42F of the correction torque signal setting unit 42 comprises a switching function (not shown) and inputs the vehicle damping coefficient $R_v$ from the vehicle speed coefficient damping conversion section 42C, the coefficient of the revolution number of the engine damping $R_{NE}$ from the coefficient of the revolution number of the engine damping conversion section 42D, and the vehicle speed 0 signal $S_0$ from the vehicle speed 0 detection section 42E. The coefficient switching section 42F outputs the vehicle speed coefficient damping $R_v$ when the vehicle speed 0 signal $S_0$ is at the L level and the coefficient of the revolution number of the engine damping $R_{NE}$ when the vehicle speed 0 signal $S_0$ is at the H level to the multiplication section 42G at the later stage.

The multiplication section 42G of the correction torque signal setting unit 42 has a multiplier or multiplication function controlled by a software (not shown). The multiplication section 42G inputs the speed torque signal $D_N$, the torque coefficient damping $R_T$, and the vehicle speed coefficient damping $R_v$ (or coefficient of the revolution number of the engine damping $R_{NE}$) to multiply and output the correction torque signal ($D_N*R_T*R_v$ or $D_N*R_T*R_{NE}$) to the target torque signal in reverse calculator 43 and the target torque signal in forward calculator 44.

The target torque signal in reverse calculator 43 has an adder or addition function of software control (not shown). The target torque signal in reverse calculator 43 adds (subtracts) the correction torque signal ($D_N*R_T*R_V$ or $D_N*R_T*R_{NE}$) to the reference torque signal $D_T$ to generate an adequate assist steering torque in electric motor 8 when steering wheel 3 returns and outputs the target torque signal ($D_T+D_N*R_T*R_V$ or $D_T+D_N*R_T*R_{NE}$), which is the results of the addition to the signal switching unit 46 at the later stage.

The target torque signal in forward calculator 44 has a subtractor or subtraction function controlled by a software (not shown).

The target torque signal in forward calculator 44 subtracts (dampens) the correction torque signal ($D_N*R_T*R_v$ or $D_N*R_T*R_{NE}$) from the reference torque signal $D_T$ to generate an adequate assist steering torque in the electric motor 8 when the steering wheel 3 turns and outputs the target torque signal ($D_T-D_N*R_T*R_V$ or $D_T-D_N*R_T*R_{NE}$), which is the results of the subtraction, to the signal switching unit 46 at the later stage.

The steering state detection unit 45 comprises a logic circuit etc. (not shown); detects the going state or the returning state of the steering wheel 3 based on the direction flag F of the steering torque signal T and the direction flag G of the revolution number signal N of the electric motor; and outputs the steering state signal $S_T$ being switched into an H level or an L level, e.g., the H level at the going state of the steering wheel 3 and the L level at the returning state of the steering wheel 3, to the signal switching unit 46. The steering state detection unit 45 judges that the state is the going state (the steering wheel 3 moves to the direction where the steering wheel 3 turns by the driver) in the case where the direction of the direction flag F is consistent with the direction of the direction flag G and that the state is the returning state (the steering wheel 3 moves to the direction where the steering wheel 3 returns by self aligning torque etc.) in the case where the direction of the direction flag F is not consistent with the direction of the direction flag G.

The signal switching unit 46 has a switching function (not shown); and inputs the target torque signal ($D_T+D_N*R_T*R_V$ or $D_T+D_N*R_T*R_{NE}$) from the target torque signal in reverse calculator 43, the target torque signal ($D_T-D_N*R_T*R_V$ or $D_T-D_N*R_T*R_{NE}$) from the target torque signal in forward calculator 44, and the steering state signal $S_T$ from the steering state detection unit 45. The signal switching unit 46 outputs the target torque signal ($D_T-D_N*R_T*R_V$ or $D_T-D_N*R_T*R_{NE}$) of the going state in the case where steering state signal $S_T$ is at the H level and the target torque signal ($D_T+D_N*R_T*R_v$ or $D_T+D_N*R_T*R_{NE}$) of the returning state in the case where the steering state signal $S_T$ is at the L level to the control signal output unit 47 at the later stage. The control signal output unit 47 comprises a PWM1 signal generator and a logic circuit (not shown), generates an electric motor control signal $D_o$ (direction signal+PWM signal) such that the deviation becomes zero by obtaining the deviation of the target torque signal ($D_T+D_N*R_T*R_V$ or $D_T+D_N*R_T*R_{NE}$) or target torque signal ($D_{T-DN}*R_T*R_V$ or $D_T-D_N*R_T*R_{NE}$) end the electric motor current signal from an electric motor current detector (not shown); and by processing the proportion, the integration, and the deviation, and outputs it to the electric motor controller 13 at the later stage.

The operation of the power steering apparatus due to the controller 12 according to the second embodiment having the configuration described above will now be described by suitably referring to FIGS. 1, 2, 3, SA to 5E, and 6.

The reference torque signal setting unit 41 generates the reference torque signal $D_T$ based on the steering torque signal T and the actual vehicle speed V at the normal mode when the vehicle speed sensor VS is not zero, whereby a higher assist steering torque signal is generated according to a larger steering torque signal T. A larger assist steering torque is generated according to a lower vehicle speed signal V if the levels of the steering torque signal T are the same.

The correction torque signal setting unit 42 generates the correction torque signal ($D_N*R_T*R_v$) based on the revolution number signal N of the electric motor, steering torque signal T and vehicle speed signal V at the normal mode when the vehicle speed from vehicle speed sensor VS is not zero, whereby a dampened amount of the assist steering torque becomes larger according to higher revolution number signal N of the electric motor. Also, a dampened amount of the assist steering torque becomes smaller according to a higher steering torque signal T. Further a dampened amount of assist steering torque becomes larger according to a higher vehicle speed signal V.

The steering operation of the driver is greatly assisted at a low vehicle speed range where the reaction force from the road surface is strong due to the damping of the reference torque signal $D_T$ generated in this way and the correction torque signal ($D_N*R_T*R_v$) for the reference torque signal $D_T$ by the target torque signal calculators 43 and 44 provides a large assist steering torque. On the other hand, since the assist steering torque is greatly reduced at a high vehicle speed range where the reaction force from the road surface is weak, the steering system 2 of the vehicle becomes stable.

Here, it assumes that the vehicle speed signal becomes zero (the vehicle speed sensor VS disconnect-fails and the vehicle is stopped). The reference torque signal setting unit 41 generates a high reference torque signal $D_T$ regardless of the actual vehicle speed, when the steering operation is performed. At the same time, the correction torque signal setting unit 42 generates the correction torque signal ($D_N*R_T*R_v*R_{NE}$) based on the signal of the revolution number of the engine Ne.

If the steering operation (steering torque signal T is high) is performed as seen at a low vehicle speed range when the actual vehicle speed is low (the signal of the revolution number of the engine speed Ne is low), a large assist steering torque is generated and the steering operation is assisted. Take note that a large assist steering torque is generated due to the fact that (1) the reference torque signal setting unit 41 generates (sets) a high reference torque signal $D_T$ based on a high steering torque signal T and a vehicle speed signal V, which is 0, and that (2) the correction torque signal setting unit 42 generates (sets) a low correction torque signal ($D_N*R_T*R_{NE}$) based on a low signal Ne of the revolution number (and a high steering torque signal T). Since the signal Ne of the revolution number of the engine is low at a low vehicle speed range, the correction torque signal ($D_N*R_T*R_{NE}$) is low, even in the case where the steering operation (sudden steering), in which case the revolution number N of the electric motor is high, is performed; whereby an instantaneous operation is available without driver's insecurity for steering operation.

The steering system 2 is stable since no large assist steering torque is generated even if the steering operation (steering torque signal T is low) as often seen at high vehicle speed range is performed at a time when the actual vehicle speed is high (the signal Ne of the revolution number of the engine is high). Take note that a large assist steering torque is not generated by the fact that (1) the reference steering torque signal setting unit 21 generates (sets) a low reference torque signal DT based on a low steering torque signal T, and that (2) the correction torque signal setting unit 42 generates (sets) a high correction torque signal ($D_N*R_T*R_{NE}$) based on the high signal Ne of the revolution number of the engine (and the low steering torque signal T). That is, the damping correction is effectively carried out by subtracting (2) the high correction torque signal ($D_N*R_T*R_{NE}$) from (1) the low reference torque signal DT.

When the vehicle speed signal V becomes 0 due to any cause such as noise or failure of the vehicle speed sensor VS during running at a high vehicle speed at which the vehicle speed signal V is high and the signal Ne of the revolution number of the engine is high, the vehicle speed 0 detection section 42E and the coefficient switching section 42F instantaneously switch the coefficient from the vehicle speed coefficient damping $R_V$ into the coefficient of revolution number of the engine damping $R_{NE}$. When both coefficients $R_V/R_{NE}$ are switched, insecurity to the driver could occur. The vehicle speed coefficient damping $R_V$ immediately before the vehicle speed signal V becoming zero is a large value, because of the high vehicle speed running. The switched coefficient of the revolution number of the engine damping $R_{NE}$ is also a large value. Therefore, insecurity is not given to the driver when switching both coefficients $R_V/R_{NE}$. Similarly, insecurity is not given to the driver in the case where the vehicle speed V is not zero. Further, insecurity is not given to the driver when switching a coefficient during running at a low vehicle speed, at which the vehicle speed V is low and the signal Ne of the revolution number of the engine is low.

The change in the revolution number of the engine is associated with vehicle speed as a whole, but there is the case where the change in the revolution number of the engine occurs without any association with the vehicle speed. The change in the revolution number of the engine without any association with the vehicle speed is relaxed when the correction torque signal is generated and when the target torque signal is output. Therefore, differing from the case of the prior art, in which the target value (target current) for the electric motor is set based on the steering torque signal and the signal of the revolution number of the engine, there is no case where steering feeling is reduced in the steering apparatus of the present invention.

There is a case where the revolution number of the engine is increased while the vehicle speed is low. In this case, the operation is adequately considered since a large assist steering torque is generated by performing the steering operation at a slow revolution number of the electric motor.

As described above, according to the second embodiment of the present invention, there is provided an electric power steering apparatus having a simple configuration which can perform light steering operation at a low vehicle speed range and which can obtain stability of the steering system at high vehicle speed range.

Further, the detector for detecting failure of vehicle speed sensor is not needed for performing the control as described above, since it would be in normal mode regardless of the occurrence of failure in the vehicle speed sensor. Therefore, the configuration can be simplified. Since time is not needed to judge noise or failure of the vehicle speed sensor when the vehicle speed is 0, the effect is obtained whether there is no blank time or no time lag in controlling.

[Third Embodiment]

Next, the embodiment of the present invention (hereinafter referred to as third embodiment) is described in which when any failure of vehicle speed sensor is detected, the correction torque signal is generated by switching the correction torque signal from the vehicle speed response into the response of the revolution number of the engine. FIG. 7 is a block configuration diagram in the electric system of the electric power steering apparatus of the third embodiment. Elements which are the same as those in the embodiment described above (hereinafter referred to as the second embodiment) have the same symbols or numerals and their descriptions are omitted. Below, parts, which are different from those of the second embodiment, are described.

A vehicle speed sensor failure detection section 42H detects failure of a vehicle speed sensor VS in the third embodiment as shown in FIG. 7.

The vehicle speed sensor failure detection unit 42H comprises a logic circuit, ROM, comparison function, and timer (not shown). It detects failure of the vehicle speed sensor VS based on the vehicle speed sensor failure detection logic shown in FIG. 8 as an example. There are two cases where the vehicle speed sensor failure detection unit 42H judges "vehicle speed sensor failure" in this logic: (1) One case is that previous vehicle speed is not less than 20 km/h and deceleration is not less than 2.5 G and (2) the other case is that the state where the revolution number of the engine is not less than 2000 rpm and the vehicle speed is 0 km/h is continued not less than 180 seconds. In the former case (1), the vehicle speed sensor failure detection section 42H judges that the vehicle speed sensor failure arises because there is deceleration, which cannot be brought about in a usual braking operation. In the later case (2), the vehicle speed sensor failure detection section 42H judges that the vehicle speed sensor failure arises, because there is racing which cannot be seen in a usual state. The vehicle speed sensor failure detection section 42H outputs failure signal $S_F$ to coefficient switching section 42F. The failure signal $S_F$ switches from the signal of L level into the signal of H level when the vehicle speed sensor VS fails. The vehicle speed sensor failure detection section 42H has a comparator to compare the vehicle speed signal V with a reference value (20 km/h), a deceleration detector for detecting deceleration, and a comparator to compare deceleration with a reference value (2.5 G) (not shown). Further, the vehicle speed sensor failure detection section 42H has a comparator to compare signal Ne of the revolution number of the engine with reference value (2000 rpm), a comparator to compare the vehicle speed signal V with a reference value (0 km/h), a timer and the like (not shown).

The coefficient switching section 42F has a switching function (not shown) and inputs the vehicle speed coefficient damping $R_V$ from the vehicle speed coefficient damping conversion section 42C, the coefficient $R_{NE}$ of the revolution number of the engine damping from the coefficient of the revolution number of the engine damping conversion section 42D, and the failure signal $S_F$ from the vehicle speed sensor failure detection section 42H. The coefficient switching section 42F outputs the vehicle speed coefficient damping $R_V$ when failure signal $S_F$ is the L level and the coefficient $R_{NE}$ of the revolution number of the engine damping when the failure signal $S_F$ is the H level to the multiplication section 42G at the later stage.

The operation of electric power steering apparatus having the vehicle speed sensor failure detection unit as described above are now described by referring to the FIGS. 1, 4, 5A–5E, 7, and 8.

The assist steering torque is generated at the time of normal mode where the vehicle speed sensor VS does not fail in the same way as in the second embodiment. The coefficient $R_{NE}$ of revolution number of the engine damping is not used at a time of normal mode.

Here, it assumes a disconnection failure, which more frequently arises in the vehicle speed sensor VS. Take note that the vehicle speed signal V becomes 0 in this case. The vehicle speed sensor failure detection section 42H detects failure of the vehicle speed sensor VS to output the failure signal $S_F$ of H level, and the coefficient is switched from the vehicle speed coefficient damping $R_V$ into the coefficient $R_{NE}$ of revolution number of the engine damping in the coefficient switching section 42F. On the other hand, the vehicle speed signal V of 0 is input to the reference torque signal setting unit 41. Therefore, the reference torque signal setting unit 41 generates a high reference torque signal $D_T$ regardless of the actual vehicle speed based on the vehicle speed signal V of 0. At the same time, the correction torque signal setting unit 42 generates a correction torque signal $(D_N * R_T * R_{NE})$ according to the signal of revolution number of the engine.

If the steering operation as often seen at a low vehicle speed range (steering torque signal T is high) is performed when the actual vehicle speed is low (signal Ne of revolution number of the engine is low), operation is adequately assisted and light steering operation can be performed similar to the second embodiment.

If the steering operation (steering torque signal T is low) as often seen at a high vehicle speed range is performed when the actual vehicle speed is high (signal Ne of revolution number of the engine is high), the steering system 2 is stable since no high assist steering torque is generated similar to the second embodiment.

If the vehicle speed signal V becomes 0 due to any failure such as disconnection of the vehicle speed sensor VS during running at a high vehicle speed where the vehicle speed signal V is high and the signal Ne of revolution number of the engine is high, the vehicle speed sensor failure detection section 42H and the coefficient switching section 42F switch the coefficient from the vehicle speed coefficient damping $R_V$ into the coefficient $R_{NE}$ of revolution number of the engine damping. When both coefficients $R_V/R_{NE}$ are switched, insecurity to the driver could occur. The vehicle speed coefficient damping $R_V$ immediately before the vehicle speed signal V becoming zero is a large value. On the other hand, the coefficient $R_{NE}$ of revolution number of engine speeds damping is also a large value. Therefore, insecurity is not given to the driver when. switching both coefficients $R_V/R_{NE}$. Similarly, insecurity is not given to the driver in the case where the vehicle speed V is not zero. Further, insecurity is not given to the driver when the coefficient is switched during running at a low vehicle speed, where the vehicle speed V is low and the signal Ne of revolution number of the engine is low.

The present invention described above is not limited to the embodiments described above since modifications and implementation may be made by those skilled in art, particularly in light of foregoing teachings. It is, therefore, contemplated by the appended claims to cover such modifications as incorporate those features, which come within spirit and scope of invention. For example, although the input dummy vehicle speed is described as means to make a reference torque signal and a correction torque signal high, means is not limited thereto. Means to multiple signals by correction coefficients respectively, of which reference torque signal and correction torque signal increase may be used. Further, fadeout may be performed when the vehicle speed is switched into the dummy vehicle speed. In more detail, previous vehicle speed where any failure is detected is previously stored and speed is gradually switched from stored speed into dummy vehicle speed, e.g., by taking about ten seconds. In this way, it is preferable because insecurity is not given to the driver during steering operation.

Further, although the use of the coefficient of revolution number of the engine is described in order to make the correction torque signal high, any other means is applicable. For example, to multiply correction torque signal by correction coefficient when correction torque signal increases may be used.

It is preferable when based on vehicle speed signal added to steering torque signal, that the reference torque signal setting unit generates a lower reference torque signal when vehicle speed is higher than the reference torque signal when vehicle speed signal is low. This is because light steering operation can be performed at low vehicle speed range where the reaction force of the road surface is strong.

It is preferable to use the correction torque signal setting unit in which correction torque signal becomes higher at a time of the vehicle speed signal=0 or the vehicle speed sensor failure than the correction torque signal at a time of the normal mode when the reference torque signal setting unit based on steering torque and vehicle speed is used. This is because the damping correction is performed and stability of the steering system is increased at a high vehicle speed range where the reaction force of the road surface is weak. Here, when the coefficient (value of axis of ordinate) becomes larger in maps of FIG. 5E used at the time of switching than coefficient in map 4 of FIG. 5D used at the time of normal node, the correction torque signal becomes higher at the time of the vehicle speed 0 or the vehicle speed sensor failure than the correction torque signal at the time of normal mode. It is preferable that the coefficient is gradually increased and decreased by fadeout when a great different value of the coefficient occurs before and after switching at the time of switching map.

According to the present invention, light steering operation with a simple configuration can be performed at a low vehicle speed even if the vehicle speed sensor fails and the stability of steering system can be obtained at high vehicle speed.

What is claimed is:

1. An electric power steering apparatus comprising:
an electric motor which applies an assist steering torque to the steering system of a vehicle; a steering torque sensor which detects the manual steering torque of said steering system; a vehicle speed sensor which detects the vehicle speed of said vehicle; a revolution number sensor for said electric motor which detects the revolution number of said electric motor; a controller which generates a control signal for controlling said electric motor; and a driver which generates a driving signal for driving said electric motor based on said control signal,
said controller including:
a reference torque signal setting unit which generates a reference torque signal which becomes high when the detected signal becomes high based on at least the signal detected from said steering torque sensor; a correction torque signal setting unit which generates a correction torque signal, which becomes high when the detected signal becomes high based on at least the signals detected from said revolution number sensor for the electric motor and from the vehicle speed sensor; and a target torque signal calculator which subtracts said correction torque signal from said reference torque signal to output a target torque signal to said electric motor;

said controller also making said correction torque signal high when failure of the vehicle speed sensor is detected.

2. An electric power steering apparatus comprising:
an electric motor which applies an assist steering torque to the steering system of a vehicle; a steering torque sensor which detects the manual steering torque of said steering system; a vehicle speed sensor which detects the vehicle speed of said vehicle; a revolution number sensor for said electric motor which detects the revolution number of said electric motor; a controller which generates a control signal for controlling said electric motor; and a driver which generates a driving signal for driving said electric motor based on said control signal, said controller including:
    a reference torque signal setting unit which generates a reference torque signal which becomes high when the detected signal becomes high based on at least the signal detected from said steering torque sensor; a correction torque signal setting unit which generates a correction torque signal, which becomes high when the detected signal becomes high based on at least the signals detected from said revolution number sensor for the electric motor and from the vehicle speed sensor; a target torque signal calculator which subtracts said correction torque signal from said reference torque signal to output a target torque signal to said electric motor; and a vehicle speed sensor failure detection unit which detects failure of the vehicle speed sensor;
    said controller also making said correction torque signal high when said vehicle speed sensor failure detection unit detects failure of the vehicle speed sensor.

3. The electric power steering apparatus as set forth in claim 2, wherein said reference torque signal setting unit generates a reference torque signal based on the signal detected from the vehicle speed sensor in addition to the signal detected from the steering torque sensor under the condition that a small reference torque signal is generated in the case where the vehicle speed sensor detects a large signal in comparison with the case of a small signal being detected, and said controller makes said reference torque signal high when said vehicle speed sensor failure detection unit detects failure of the vehicle speed sensor.

4. The electric power steering apparatus as set forth in claim 3, wherein said vehicle speed sensor failure detection unit possesses a storage device which stores the previous vehicle speed and a deceleration detector which detects the degree of deceleration with reference to the current and previous vehicle speeds, and wherein said vehicle speed sensor failure detection unit detects failure of the vehicle speed sensor at the time which the previous vehicle speed is detected to be larger than a predetermined level and the degree of deceleration is detected to be larger than a predetermined level.

5. The electric power steering apparatus as set forth in claim 3, wherein said vehicle speed sensor failure detection unit includes a revolution number sensor for the engine and a timer, and wherein said vehicle speed sensor failure detection unit detects failure of the vehicle speed sensor at the time which the revolution number of the engine is detected to be larger than a predetermined level and the state of the vehicle speed being 0 km/h is continued for a period longer than a predetermined period.

6. The electric power steering apparatus as set forth in claim 2, wherein said vehicle speed sensor failure detection unit includes a storage device which stores the previous vehicle speed and a deceleration detector which detects the degree of deceleration with reference to the current and previous vehicle speeds, and wherein said vehicle speed sensor failure detection unit detects failure of the vehicle speed sensor at the time which the previous vehicle speed is detected to be larger than a predetermined level and the degree of deceleration is detected to be larger than a predetermined level.

7. The electric power steering apparatus as set forth in claim 2, wherein said vehicle speed sensor failure detection unit includes a revolution number sensor for the engine and a timer, and wherein said vehicle speed sensor failure detection unit detects failure of the vehicle speed sensor at the time which the revolution number of the engine is detected to be larger than a predetermined level and the state of the vehicle speed being 0 km/h is continued for a period longer than a predetermined period.

8. An electric power steering apparatus comprising:
an electric motor which applies an assist steering torque to the steering system of a vehicle; a steering torque sensor which detects the manual steering torque of said steering system; a vehicle speed sensor which detects the vehicle speed of said vehicle; a revolution number sensor for said electric motor which detects the revolution number of said electric motor; a controller which generates a control signal for controlling said electric motor; and a driver which generates a driving signal for driving said electric motor based on said control signal, said controller including:
    a reference torque signal setting unit which generates a reference torque signal which becomes high when the detected signal becomes high based on at least the signal detected from said steering torque sensor; a correction torque signal setting unit which generates a correction torque signal, which becomes high when the detected signal becomes high based on at least the signals detected from said revolution number sensor for the electric motor and from the vehicle speed sensor; and a target torque signal calculator which subtracts said correction torque signal from said reference torque signal to output a target torque signal to said electric motor;
    said electric power steering apparatus also having a revolution number sensor for the engine which detects the revolution number of the engine and a vehicle speed 0 detection unit which detects that the vehicle speed is zero,
    said controller also making the correction torque signal high according to the signal detected from said revolution number sensor for the engine, when said vehicle speed 0 detection unit detects that the vehicle speed is zero.

9. An electric power steering apparatus comprising:
an electric motor which applies an assist steering torque to the steering system of a vehicle; a steering torque sensor which detects the manual steering torque of said steering system; a vehicle speed sensor which detects the vehicle speed of said vehicle; a revolution number sensor for said electric motor which detects the revolution number of said electric motor; a controller which generates a control signal for controlling said electric motor; and a driver which generates a driving signal for driving said electric motor based on said control signal, said controller including:
    a reference torque signal setting unit which generates a reference torque signal which becomes high when the detected signal becomes high based on at least the signal detected from said steering torque sensor; a correction torque signal setting unit which generates a correction torque signal, which becomes high when the detected signal becomes high based on at least the signals detected from said revolution number sensor for the electric motor and from the vehicle speed sensor; and a target torque signal calculator which subtracts said correction torque signal from said reference torque signal to output a target torque signal to said electric motor;

said electric power steering apparatus also having a revolution number sensor for the engine which detects the revolution number of the engine and a vehicle speed sensor failure detection unit which detects failure of the vehicle speed sensor, said controller also making the correction torque signal high according to the signal detected from said revolution number sensor for the engine, when said vehicle speed sensor failure detection unit detects failure of the vehicle speed sensor.

10. The electric power steering apparatus as set forth in claim 9, wherein said vehicle speed sensor failure detection unit possesses a storage device which stores the previous vehicle speed and a deceleration detector which detects the degree of deceleration with reference to the current and previous vehicle speeds, and wherein said vehicle speed sensor failure detection unit detects failure of the vehicle speed sensor at the time which the previous vehicle speed is detected to be larger than a predetermined level and the degree of deceleration is detected to be larger than a predetermined level.

11. The electric power steering apparatus as set forth in claim 9, wherein said vehicle speed sensor failure detection unit includes the revolution number sensor for the engine and a timer, and wherein said vehicle speed sensor failure detection unit detects failure of the vehicle speed sensor at the time which the revolution number of the engine is detected to be larger than a predetermined level and the state of the vehicle speed being 0 km/h is continued for a period longer than a predetermined period.

* * * * *